(12) United States Patent
Harada

(10) Patent No.: US 10,502,952 B2
(45) Date of Patent: Dec. 10, 2019

(54) LIGHT SOURCE DEVICE, IMAGE PROJECTION APPARATUS, AND HEAD-UP DISPLAY APPARATUS

(71) Applicant: Japan Display Inc., Tokyo (JP)

(72) Inventor: Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/474,036

(22) Filed: Mar. 30, 2017

(65) Prior Publication Data

US 2017/0285340 A1 Oct. 5, 2017

(30) Foreign Application Priority Data

Apr. 1, 2016 (JP) .................... 2016-074269

(51) Int. Cl.
| | | |
|---|---|---|
| *G02B 27/01* | (2006.01) | |
| *G02B 26/10* | (2006.01) | |
| *H04N 9/31* | (2006.01) | |
| *G02B 27/09* | (2006.01) | |
| *G02B 3/06* | (2006.01) | |
| *G02B 5/00* | (2006.01) | |

(52) U.S. Cl.
CPC .......... *G02B 27/0101* (2013.01); *G02B 3/06* (2013.01); *G02B 5/005* (2013.01); *G02B 26/101* (2013.01); *G02B 27/0988* (2013.01); *H04N 9/3129* (2013.01); *G02B 2027/0118* (2013.01)

(58) Field of Classification Search
CPC .. G02B 27/0101; G02B 27/0988; G02B 3/06; G02B 5/005; G02B 26/101; H04N 9/3129; H04N 2027/0118
See application file for complete search history.

(56) References Cited

U.S. PATENT DOCUMENTS

| | | | | |
|---|---|---|---|---|
| 6,740,869 B2* | 5/2004 | Okino | ................. | G02B 26/123 |
| | | | | 250/236 |
| 2001/0050661 A1* | 12/2001 | Noda | ................. | G09G 3/3413 |
| | | | | 345/32 |
| 2007/0103717 A1* | 5/2007 | Ono | ..................... | G03G 15/553 |
| | | | | 358/1.14 |

FOREIGN PATENT DOCUMENTS

| | | |
|---|---|---|
| JP | 2004-144816 A | 5/2004 |
| JP | 2013-025247 A | 2/2013 |
| JP | 2015-082023 A | 4/2015 |

\* cited by examiner

*Primary Examiner* — Michael E Teitelbaum
(74) *Attorney, Agent, or Firm* — Michael Best & Friedrich LLP

(57) ABSTRACT

According to an aspect, a light source device includes: a light emitting device that emits a light beam capable of being modulated; and a scanning device that deflects the light beam in a first direction and a second direction intersecting the first direction. The light beam has a light quantity varying region in which a light quantity decreases outward from a center of the light beam in at least one of the first direction or the second direction. The scanning device overlaps the light quantity varying regions of a plurality of the light beams with each other with respect to a scanning direction along directions in which the light quantities of the light beams decrease.

8 Claims, 14 Drawing Sheets

FIG.12

```
START
  ↓
S1 ANALYZE IMAGE
  ↓
S2 DETERMINE LUMINANCE MODULATION
  ↓
S3 CALCULATE LUMINANCE DISTRIBUTION
  ↓
S4 CALCULATE PIXEL SIGNALS CORRESPONDING TO LUMINANCE DISTRIBUTION
  ↓
S5 OUTPUT PIXEL SIGNALS AND DRIVE LIGHT SOURCE DEVICE
  ↓
END
```

FIG.13

| INPUT GRADATION VALUES (R, G, B) | LIGHT QUANTITY (%) | PIXEL SIGNALS (R, G, B) |
|---|---|---|
| (100, 100, 100) | 100 | (100, 100, 100) |
| | 50 | (200, 200, 200) |

LIGHT SOURCE DEVICE, IMAGE PROJECTION APPARATUS, AND HEAD-UP DISPLAY APPARATUS

CROSS-REFERENCE TO RELATED APPLICATIONS

This application claims priority from Japanese Application No. 2016-074269, filed on Apr. 1, 2016, the contents of which are incorporated by reference herein in its entirety.

BACKGROUND

1. Technical Field

The present invention relates to a light source device, an image projection apparatus, and a head-up display apparatus.

2. Description of the Related Art

As described, for example, in Japanese Patent Application Laid-open Publication No. 2004-144816, image projection apparatuses, such as projectors, are known that use light from a light source to project an image onto an external component (such as a screen) to allow the image to be viewed.

To ensure luminance of the image using the configuration to project the image as described above, the luminance of the light from the light source is generally increased. In this case, a problem occurs that areas to be viewed as dark areas (such as black areas) are also brightened, and thus, the image is reduced in contrast. A configuration is known that uses, for example, a light limiting device to adjust the luminance of the light from the light source according to whether the image is bright or dark. Although being capable of adjusting the luminance of the overall image, the light limiting device is not capable of adjusting the luminance according to the brightness and darkness of each portion in the image, and hence does not solve the problem with the contrast described above.

The problem with the contrast described above can occur not only in the projectors, but also in the image projection apparatuses, such as head-up display apparatuses (HUDs), that project the image to allow it to be viewed.

For the foregoing reasons, there is a need for a light source device, an image projection apparatus, and a head-up display apparatus that can provide a higher contrast.

SUMMARY

According to an aspect, a light source device includes: a light emitting device that emits a light beam capable of being modulated; and a scanning device that deflects the light beam in a first direction and a second direction intersecting the first direction. The light beam has a light quantity varying region in which a light quantity decreases outward from a center of the light beam in at least one of the first direction or the second direction. The scanning device overlaps the light quantity varying regions of a plurality of the light beams with each other with respect to a scanning direction along directions in which the light quantities of the light beams decrease.

According to another aspect, an image projection apparatus includes: the light source device; and an image output device that uses the light beam as a light source to output an image.

According to another aspect, a head-up display apparatus includes: a light source device; and an image projection device. The light source device includes: a light emitting device that emits a light beam capable of being modulated; and a scanning device that deflects the light beam in a first direction and a second direction intersecting the first direction. The image projection device includes an image output device that uses the light beam as a light source to output an image.

BRIEF DESCRIPTION OF THE DRAWINGS

FIG. 12 is a flowchart illustrating an exemplary flow of operation control of the image projection apparatus;

FIG. 13 is a diagram illustrating an example of correction of pixel signals based on input gradation values and a light quantity;

DETAILED DESCRIPTION

Figure 1:
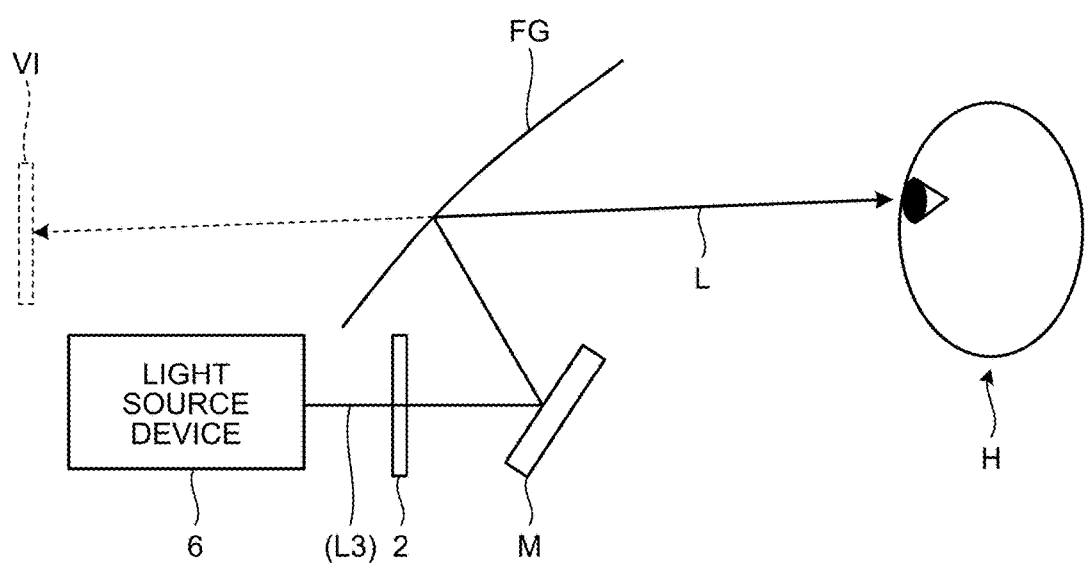
FIG. 1 is a schematic view illustrating the main configuration of an image projection apparatus according to an embodiment of the present invention.

The following describes an embodiment of the present invention with reference to the drawings. The disclosure is merely an example, and the present invention naturally encompasses appropriate modifications easily conceivable by those skilled in the art while maintaining the gist of the invention. To further clarify the description, widths, thicknesses, shapes, and the like of various parts will be schematically illustrated in the drawings as compared with actual aspects thereof, in some cases. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a schematic view illustrating the main configuration of an image projection apparatus according to the embodiment. The image projection apparatus includes, for example, a light source device 6 and an image output device 2. The image output device 2 outputs an image using a light beam L3 as a light source from the light source device 6. The light beam L3 emitted from the light source device 6 is transmitted through or reflected by the image output device 2, and after being reflected by a mirror M and a windshield FG, reaches a user H as reflected light L. As a result, the light beam L3 is recognized as an image VI within a field of view of the user. In other words, the image projection apparatus of the present embodiment serves as a head-up display apparatus (HUD) using the mirror M and the windshield FG.

Figure 2:
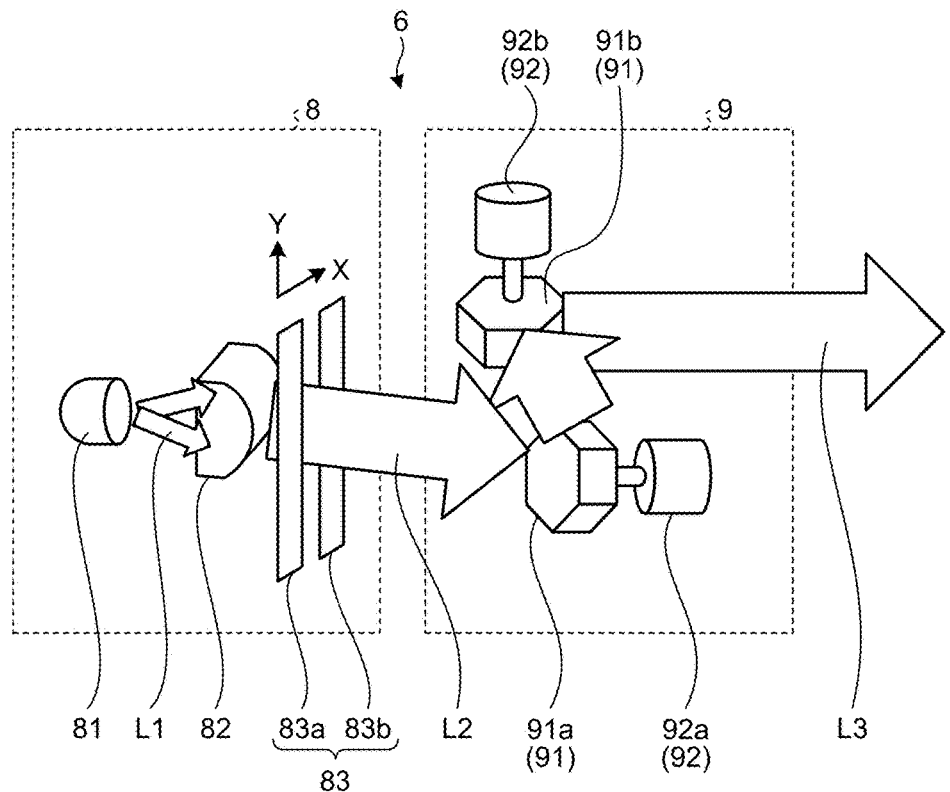
FIG. 2 is a schematic perspective view illustrating the main configuration of a light source device.

FIG. 2 is a schematic perspective view illustrating the main configuration of the light source device 6. The light source device 6 includes, for example, a light emitting device 8 and a scanning device 9. The light emitting device 8 emits a light beam (light beam L2) capable of being modulated. Specifically, the light emitting device 8 includes, for example, an illumination element 81, a lens 82, and a light-shielding device 83.

The illumination element 81 includes, for example, a light source, such as a light emitting diode (LED) and a modulator that modulates light emitted from the light source. The specific configuration of the modulator depends on the specific configuration of the light source. If the light source is the LED, examples of the system employed for the modulator include, but are not limited to, what is called a pulse width modulation (PWM) system and what is called a current control system. The pulse width modulation (PWM) system controls the light quantity by controlling, for example, the ratio between light-on time and light-off time of the LED. The current control system controls the luminance produced from the LED by controlling the level of a current supplied to the LED. While the illumination element 81 of the present embodiment is configured to emit a light beam L1 as white light toward the lens 82, the color of the light is changeable as appropriate, as will be described later.

FIG. 2 illustrates an example in which a cylindrical lens is used as the lens 82. The cylindrical lens is a lens that has a convex-lens-like curvature in one direction (Y-direction) and has no curvature in another direction (X-direction) intersecting the one direction. The lens 82 serving as the cylindrical lens is provided on the optical axis of the light beam L1 emitted from the illumination element 81, and refracts the light beam L1 with respect to the one direction. The Y-direction corresponds to, for example, the vertical direction. The X-direction corresponds to, for example, the horizontal direction. In the present embodiment, the Y-direction corresponds to the vertical synchronizing scanning direction of the image output device 2, and the X-direction corresponds to the horizontal synchronizing scanning direction of the image output device 2. In the present embodiment, one direction (Y-direction) is also called a first direction, and the other direction (X-direction) is also called a second direction.

The light-shielding device 83 adjusts the width of the light beam L1 emitted from the illumination element 81. Specifically, the light-shielding device 83 includes, for example, two light-shielding plates 83*a* and 83*b* arranged in the other direction. The two light-shielding plates 83*a* and 83*b* are plate-like members. The two light-shielding plates 83*a* and 83*b* extend along an X-Y plane along which one direction (Y-direction) and the other direction (X-direction) extend. The two light-shielding plates 83*a* and 83*b* are arranged so that a clearance therebetween in the other direction corresponds to a predetermined width in the other direction of the light beam L2. The light-shielding device 83 passes the light only through the clearance between the two light-shielding plates 83*a* and 83*b* with respect to the other direction. The light beam L2 emitted from the light emitting device 8 is a light beam obtained as follows: The light beam L1 emitted from the illumination element 81 passes through the lens 82, and the width in the other direction of light beam is adjusted to a preset width by the light-shielding device 83. In the description of the present embodiment, the "optical axis" refers to an optical axis passing through the center of the light beam L2 to be described later.

Figure 3:
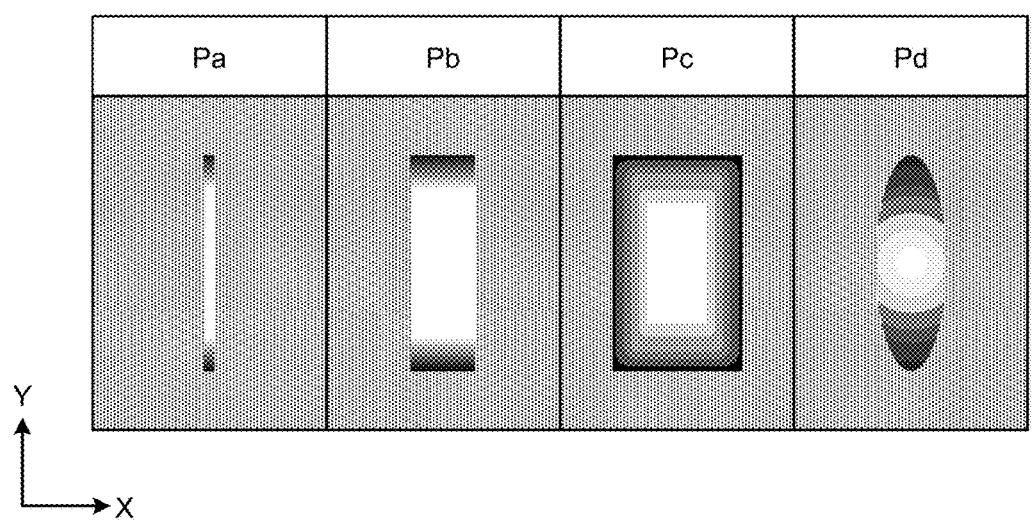
FIG. 3 is a diagram illustrating exemplary light quantity distributions of a light beam in an X-Y plane.

FIG. 3 is a diagram illustrating exemplary light quantity distributions of the light beam L2 in the X-Y plane. In FIG. 3, the periphery (margin) of the illustrated light beam L2 is shaded in order to more clearly illustrate the contrast of the light beam L2. The light beam L2 has a light quantity varying region in which the light quantity decreases outward from the center of the light beam L2 along at least one of the first and second directions (for example, along at least one of the X- and Y-directions constituting the two-dimensional directions). Specifically, as illustrated by, for example, patterns Pa and Pb in FIG. 3, the light beam L2 forms the light quantity varying region in which the light quantity gradually decreases outward and toward both end sides in one direction (Y-direction) from a light quantity at the optical axis passing through the center of the light beam L2. The light quantity varying region is formed corresponding to the curved surface of the cylindrical lens (lens 82) for forming the light beam L2. In the present embodiment, the curvature with respect to one direction of the cylindrical lens refracts the light beam L1 coming from the illumination element 81 so as to converge the light in the one direction, and thus forms the light quantity varying region.

The pattern Pa differs from the pattern Pb only in width in the other direction of the light beam L2. The width in the other direction of the light beam L2 is changeable as appropriate according to the clearance between the two light-shielding plates 83a and 83b. The light quantity distribution of the light beam L2 in the X-Y plane is not limited to those of the patterns Pa and Pb. For example, the light beam L2 exhibiting the light quantity distribution of a pattern Pc is obtained by using two cylindrical lenses as the lens 82. The pattern Pc has a light quantity varying region in which the light quantity decreases outward from the center of the light beam L2 with respect to two directions of one direction (Y-direction) and the other direction (X-direction). More specifically, the two cylindrical lenses are provided in the light emitting device 8, and one of the two cylindrical lenses is arranged in the same manner as the cylindrical lens described above. In other words, one of the two cylindrical lenses is arranged such that the one cylindrical lens has a convex-lens-like curvature in one direction (Y-direction) and no curvature in the other direction (X-direction). The other of the two cylindrical lenses is arranged such that the other cylindrical lens has a convex-lens-like curvature in the other direction and no curvature in the one direction. The light beam L2 exhibiting the light quantity distribution of the pattern Pc is obtained by arranging the two cylindrical lenses in this manner. The light beam L2 exhibiting a light quantity distribution of a pattern Pd is obtained by using a lens having a spherical refracting surface as the lens 82. The pattern Pd has a light quantity varying region in which the light quantity decreases radially outward from the center of the light beam L2. In the case of the pattern Pc or Pd, the light-shielding device 83 need not be used.

The scanning device 9 deflects the light beam L2 in the first direction (such as the Y-direction) and in the second direction (such as the X-direction). Specifically, the scanning device 9 includes, for example, an optical axis changing device 91 and a driving device 92. The optical axis changing device 91 changes the traveling direction of the light beam L2. Specifically, the optical axis changing device 91 includes, for example, two polygonal mirrors 91a and 91b. Each of the polygonal mirrors 91a and 91b has side surface parts corresponding to the polygonal sides serving as mirror surfaces, and reflect the light beam L2 to change the traveling direction thereof. More specifically, one of the two polygonal mirrors 91a and 91b changes the traveling direction of the light beam L2 along the one direction (Y-direction), and the other of the two polygonal mirrors 91a and 91b changes the traveling direction of the light beam L2 along the other direction (X-direction). The two polygonal mirrors 91a and 91b are rotatably provided, and are capable of adjusting the traveling direction of the light beam L2 by being adjusted in rotational angle. In FIG. 2, reference numeral L2 is assigned to the light beam the traveling direction of which has not been adjusted by the scanning device 9, and reference numeral L3 is assigned to the light beam the traveling direction of which has been adjusted. The light beams L2 and L3 are the same light beam except in whether the traveling direction has been adjusted.

The driving device 92 causes the optical axis changing device 91 to change the traveling direction of the light beam L3 so that the light beam L3 performs scanning in the two-dimensional directions. Specifically, the driving device 92 includes, for example, servomotors 92a and 92b coupled to rotational center shafts of the two polygonal mirrors 91a and 91b, respectively. The driving device 92 rotates the two polygonal mirrors 91a and 91b by driving amounts and in driving sequences determined in advance. By this driving operation, the light beam L3 reflected by the two polygonal mirrors 91a and 91b is projected so as to scan an image output area 21 (refer to FIG. 14) included in the image output device 2 in the two-dimensional directions along the X-Y plane. More specifically, the scanning device 9 performs horizontal scanning in which the light beam L3 is deflected from one end side to the other end side along the horizontal synchronizing scanning direction (X-direction) of the image output area 21 of the image output device 2, and performs vertical scanning in which the horizontal scanning is sequentially performed from one end side to the other end side in the vertical synchronizing scanning direction (Y-direction) of the image output area 21. In this manner, the scanning device 9 deflects the light beam L3 in the two-dimensional directions. In the scanning in the two-dimensional directions, the scanning device 9 overlaps light quantity varying regions of a plurality of light beams with each other with respect to a scanning direction along directions in which the light quantities of the light beams L3 decrease.

Figure 4:
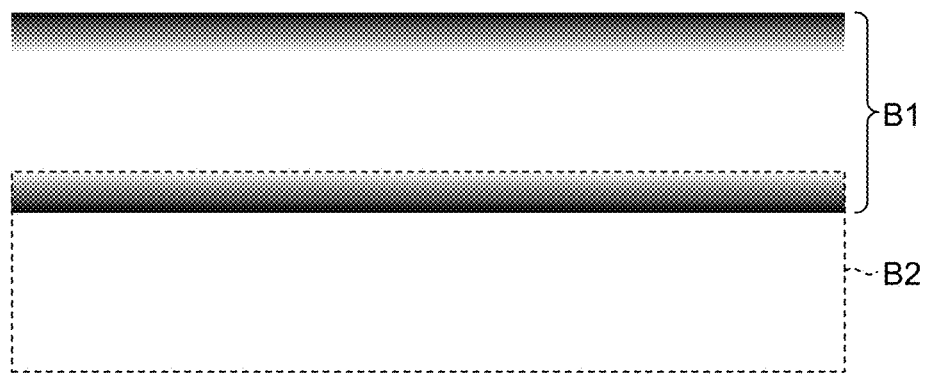
FIG. 4 is a diagram illustrating an exemplary correspondence relation between a light quantity distribution in a projection region of the light beam obtained by one horizontal scan and a position of a projection region of the light beam in which the next horizontal scan is to be performed.

FIG. 4 is a diagram illustrating an exemplary correspondence relation between a light quantity distribution in a projection region B1 of the light beam L3 obtained by one horizontal scan and a position of a projection region B2 of the light beam L3 in which the next horizontal scan is to be performed. After one horizontal scan is performed with the light beam L3 of the pattern Pa or Pb, the projection region B1 of the light beam L3 is formed, as illustrated in FIG. 4. In this manner, in one horizontal scan, the light quantity varying region formed along the direction (Y-direction) orthogonal to the direction of the horizontal scan (X-direction) is simply widened in the direction of the horizontal scan, without any change in the light quantity that gradually decreases from the center.

Figure 5:
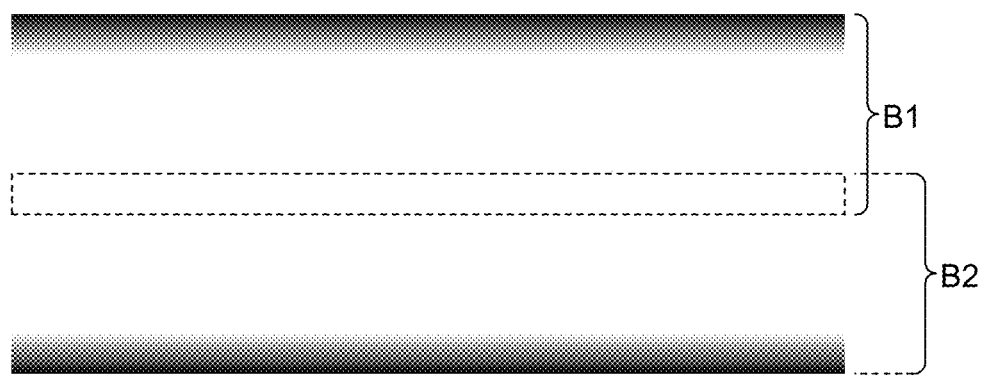
FIG. 5 is a diagram illustrating an exemplary light quantity distribution after the horizontal scan to project light onto the projection region of the light beam illustrated in FIG. 4 is performed.

FIG. 5 is a diagram illustrating an exemplary light quantity distribution after the horizontal scan to project light onto the projection region B2 of the light beam L3 illustrated in FIG. 4 is performed. As illustrated by the positional relation between the projection regions of B1 and B2 of the light beam L3 illustrated in FIG. 4, the scanning device 9 overlaps one light quantity varying region with another light quantity varying region. The one light quantity varying region is a region in the projection region B1 of the light beam L3 in which the horizontal scan has already been performed, and the other light quantity varying region is a region in the projection region B2 of the light beam L3 in which the horizontal scan is to be performed subsequently to the scan of the one light quantity varying region. The one light quantity varying region in the projection region B1 described above may be, for example, a light quantity varying region on the other end side in the vertical synchronizing scanning direction in the projection region B1. The other light quantity varying region in the projection region B2 described above may be, for example, a light quantity varying region on the one end side in the vertical synchronizing scanning direction in the projection region B2. The vertical scanning amount in one direction (Y-direction) of the scanning device 9 is set in advance so that the overlapping described above occurs. As a result, the light quantity varying regions overlap each other in an overlapping region between the projection region B1 of the light beam L3 and the projection region B2 of the light beam L3. The direction of reduction in light quantity in the one light quantity varying region in the projection region B1 of the light beam L3 (downward direction in FIG. 5) is opposite to the direction of reduction in light quantity in the other light quantity varying region in the projection region B2 of the light beam L3 (upward direction in FIG. 5). As a result, the light quantity varying regions overlap each other, such that a relatively brighter portion overlaps a relatively darker portion in the light quantity varying regions. Hence, the light quantity is averaged in the overall overlapping region. Accordingly, as illustrated in FIG. 5, the reduction in light quantity in one light quantity varying region out of the light quantity varying regions that have been formed by one horizontal scan is mitigated by the next horizontal scan.

Figure 6:
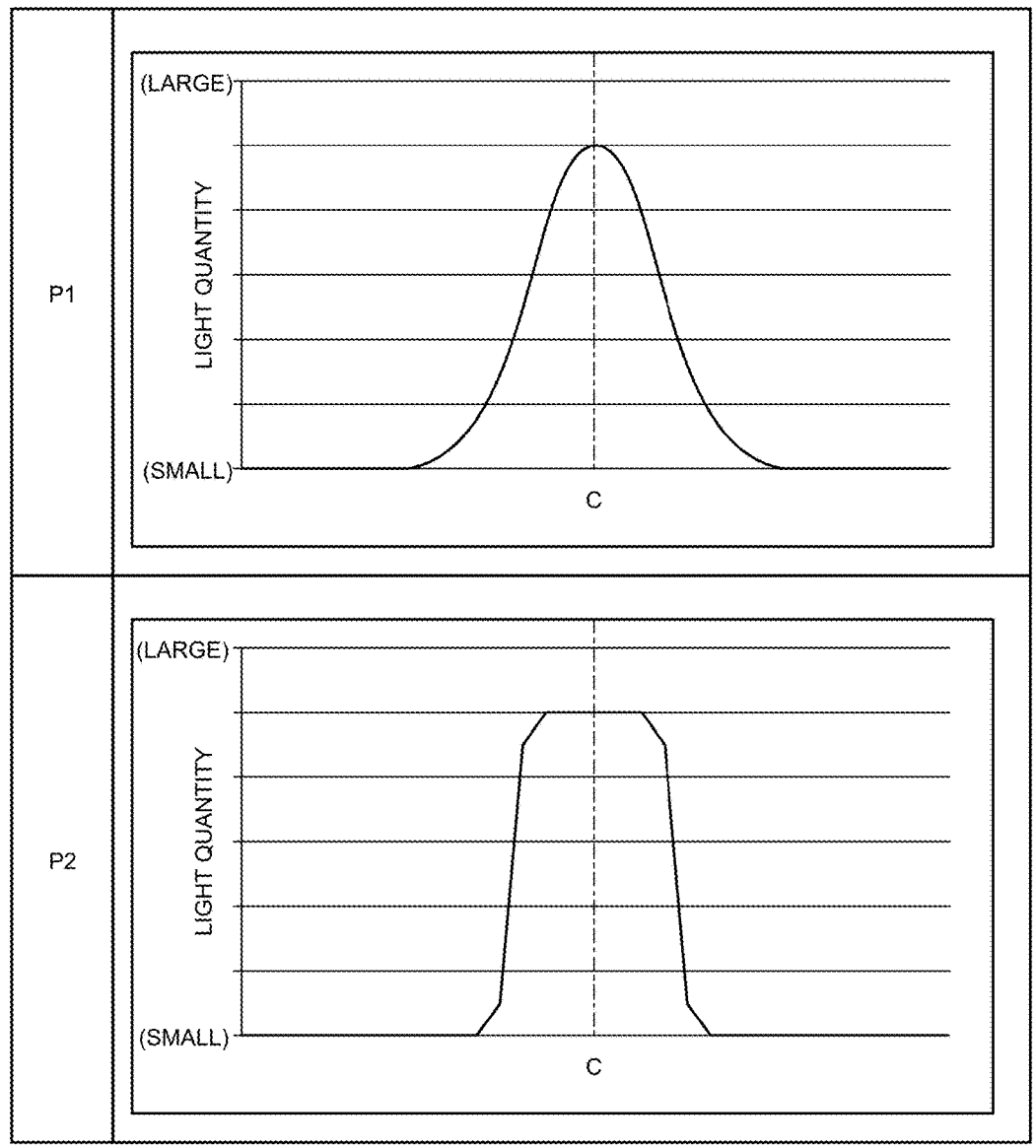
FIG. 6 depicts diagrams illustrating exemplary light quantity distribution patterns along one direction (Y-direction) of a light beam emitted from a light emitting device.

FIG. 6 depicts diagrams illustrating exemplary light quantity distribution patterns along one direction (Y-direction) of the light beam L2 emitted from the light emitting device 8. The light quantity distribution of the light beam L2 emitted from the light emitting device 8 depends on the curvature of an optical component (such as the lens 82) in the light emitting device 8 and also depends on the direction of a curved surface formed by the curvature. As illustrated in FIG. 2, the light passing through the lens 82 having a curvature with respect to one direction passes light to produce the light beam L2 of the present embodiment. As a result, a light quantity distribution pattern along the one direction, such as a pattern P1 or P2 illustrated in FIG. 6, is obtained. Assuming that the light quantity at the center of the light beam L2 is a reference value (100%), a first position is a position where the light quantity is halved (50%) from the reference value, and a second position is a position where the light quantity becomes equal to zero (0%). The pattern P1 is a light quantity distribution pattern in which a distance from the first position to the second position is larger than a distance from the center to the first position. The pattern P2 is a light quantity distribution pattern in which the distance from the center to the first position is equal to the distance from the first position to the second position. In the pattern P2, with respect to the first position, the degree of increase in the light quantity toward the center of the light beam L2 has a symmetric relation with the degree of decrease in the light quantity toward the second position.

Figure 7:
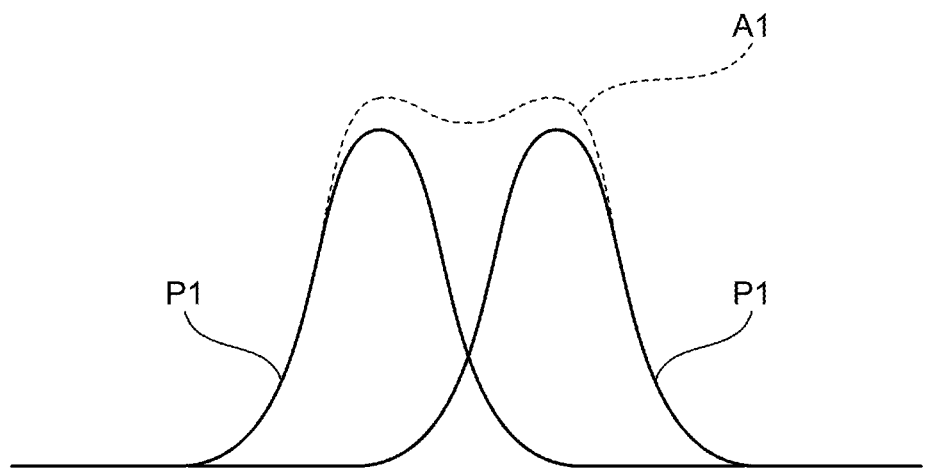
FIG. 7 is a diagram illustrating an example of change in the light quantity distribution obtained by overlapping of light beams.
Figure 8:
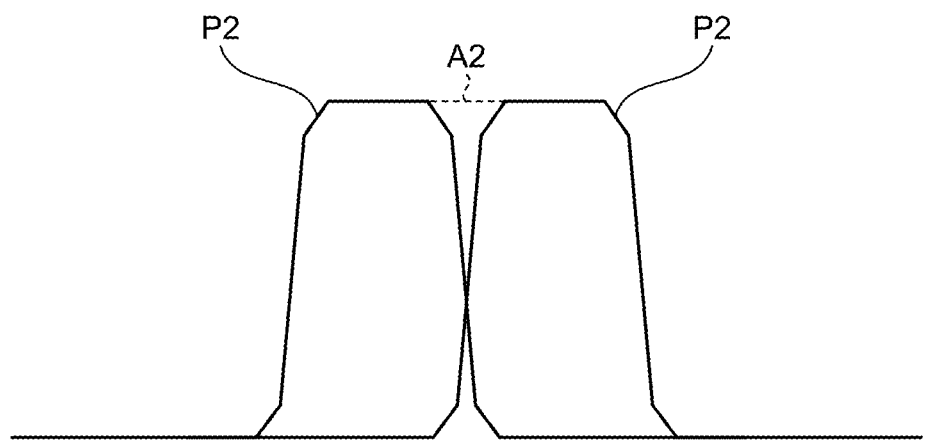
FIG. 8 is a diagram illustrating another example of the change in the light quantity distribution obtained by overlapping of light beams.

FIGS. 7 and 8 are diagrams each illustrating an example of change in the light quantity distribution obtained by overlapping of the light beams L3. The description with reference to FIGS. 7 and 8 assumes that the light quantity is constant between the scanning of the projection region B1 of the light beam L3 and the scanning of the projection region B2 of the light beam L3. If the light beams L3 of the pattern P1 are overlapped with each other such that the first position of one of the light beams L3 matches the first position of the other of the light beams L3, the center of one of the light beams L3 overlaps a part of the light quantity varying region of the other of the light beams L3. As a result, the light quantity at the peak is larger than the light quantity at the center of the individual light beam L3, as illustrated by an overlap pattern A1 in FIG. 7. If the light beams L3 of the pattern P2 are overlapped with each other such that the first position of one of the light beams L3 matches the first position of the other of the light beams L3, the light quantity of the overlapping region between the projection region B1 of the light beam L3 and the projection region B2 of the light beam L3 is equal to the light quantity at the center of the light beams L3, as illustrated by an overlap pattern A2 in FIG. 8. In this manner, the scanning device 9 can overlap the light quantity varying regions with each other so that the light quantity in the overlapped light quantity varying regions is equal to the light quantity at the center.

Figure 9:
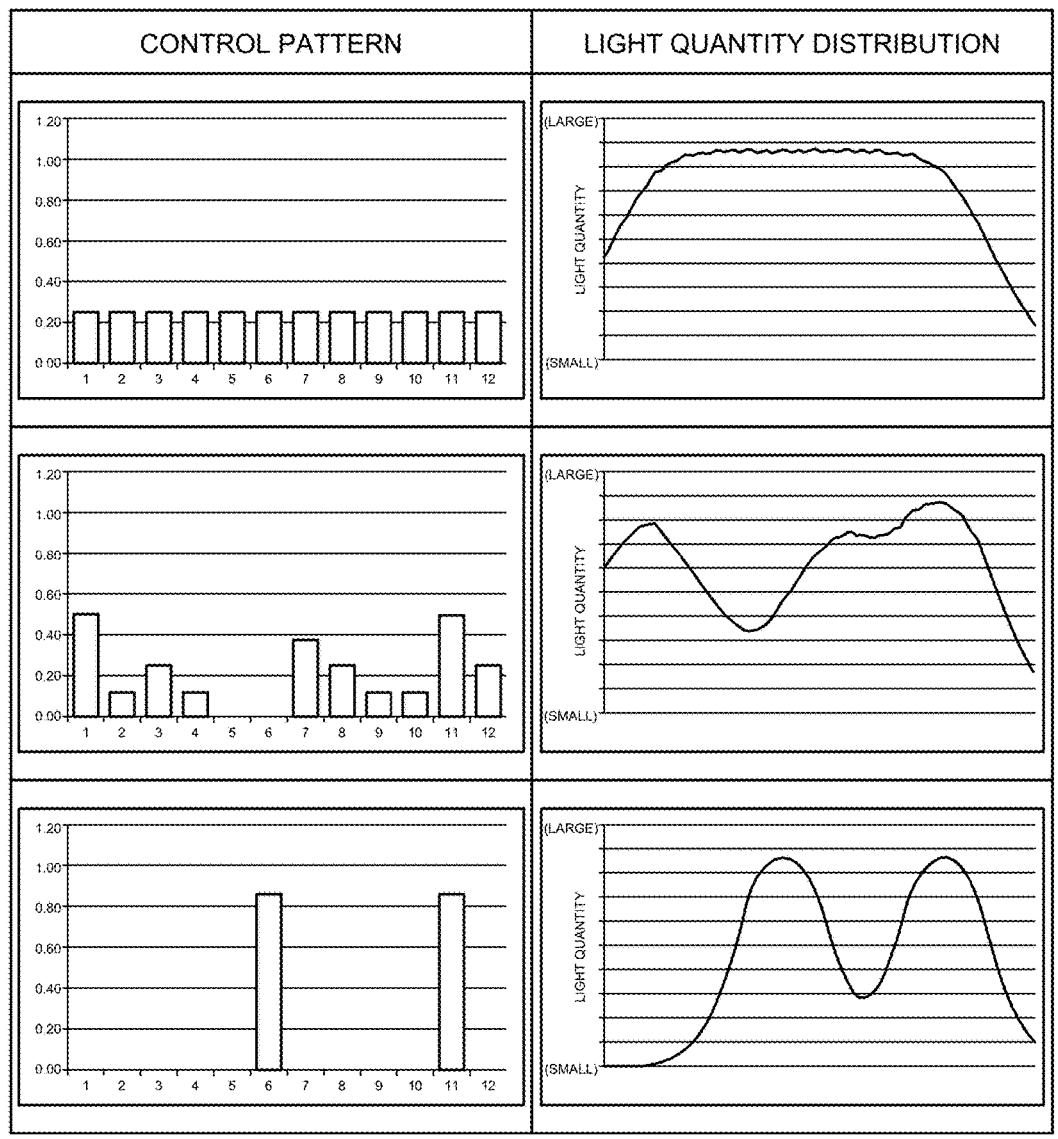
FIG. 9 depicts diagrams illustrating exemplary relations between control patterns for controlling luminance of light constituting light beams overlapping along one direction and light quantity distributions along the one direction obtained when the control patterns are used to output the light beams that exhibit light quantity distribution patterns in each of which the center of one of the light beams overlaps a part of a light quantity varying region of the other of the light beams.

FIG. 9 depicts diagrams illustrating exemplary relations between control patterns for controlling luminance of light constituting the light beams L3 overlapping along one direction (Y-direction) and light quantity distributions along the one direction obtained when the control patterns are used to output the light beams L3 that exhibit light quantity distribution patterns in each of which the center of one of the light beams L3 overlaps a part of a light quantity varying region of the other of the light beams L3. In the present embodiment, as illustrated by, for example, FIG. 9 and FIG. 10 to be explained later, the light quantity distribution in one direction can be controlled by controlling the levels of light quantities in a plurality of horizontal scans by which the light quantity varying regions are overlapped with respect to the one direction. In other words, the light quantity distribution pattern along one direction can be controlled as follows: the light quantity is set to be relatively large in a horizontal scan performed in a position where a relatively large light quantity is required, and the light quantity is set to be relatively small in a horizontal scan performed in a position where a relatively small light quantity is required, with respect to the one direction.

FIG. 9 illustrates examples in which the light quantity distribution pattern P1 illustrated in FIG. 6 is used. In the case of the light quantity distribution pattern P1 illustrated in FIG. 6, the center of one of the light beams L3 overlaps a part of the light quantity varying region of the other of the light beams L3. As a result, for example, the center in the other direction (X-direction, that is, the horizontal synchronizing scanning direction) of the projection region of the light beam L3 projected onto one end with respect to the one direction (Y-direction, that is, the vertical synchronizing scanning direction) overlaps the projection region in the other direction of another light beam L3 projected onto the other end side. The center in the other direction of the projection region of the light beam L3 projected onto the other end with respect to the one direction overlaps the projection region in the other direction of another light beam L3 projected onto the one end side. The center in the other direction of the projection region of the light beam L3 projected onto a place other than both ends with respect to the one direction overlaps the projection regions in the other direction of other two light beams L3 projected onto both end sides. As a result, as illustrated in FIG. 9, the light quantity tends to be larger at the center in the other direction of the projection region of the light beam L3 projected onto a place other than both ends than at both ends, with respect to the one direction. As a result, not only in the case illustrated in FIG. 5, but also in the case of the light quantity distribution pattern in which the distance from the first position where the light quantity is halved (50%) from the reference value to the second position where the light quantity becomes equal to zero (0%) is larger than the distance from the center to the first position, it is preferable to employ a method for determining the projection ranges and the control pattern of the light beams L3 with respect to the one direction, taking the tendency described above into consideration. Examples of such a method include, but are not limited to, a method in which the projection regions in the other direction of the light beams L3 projected onto both ends with respect to the one direction are located outside the image output area 21, and the projection region in the other direction of the light beam L3 projected onto a place other than both ends is located inside the image output area 21, and a method in which the control is finely performed by increasing the resolution of the control pattern with respect to the one direction.

Figure 10:
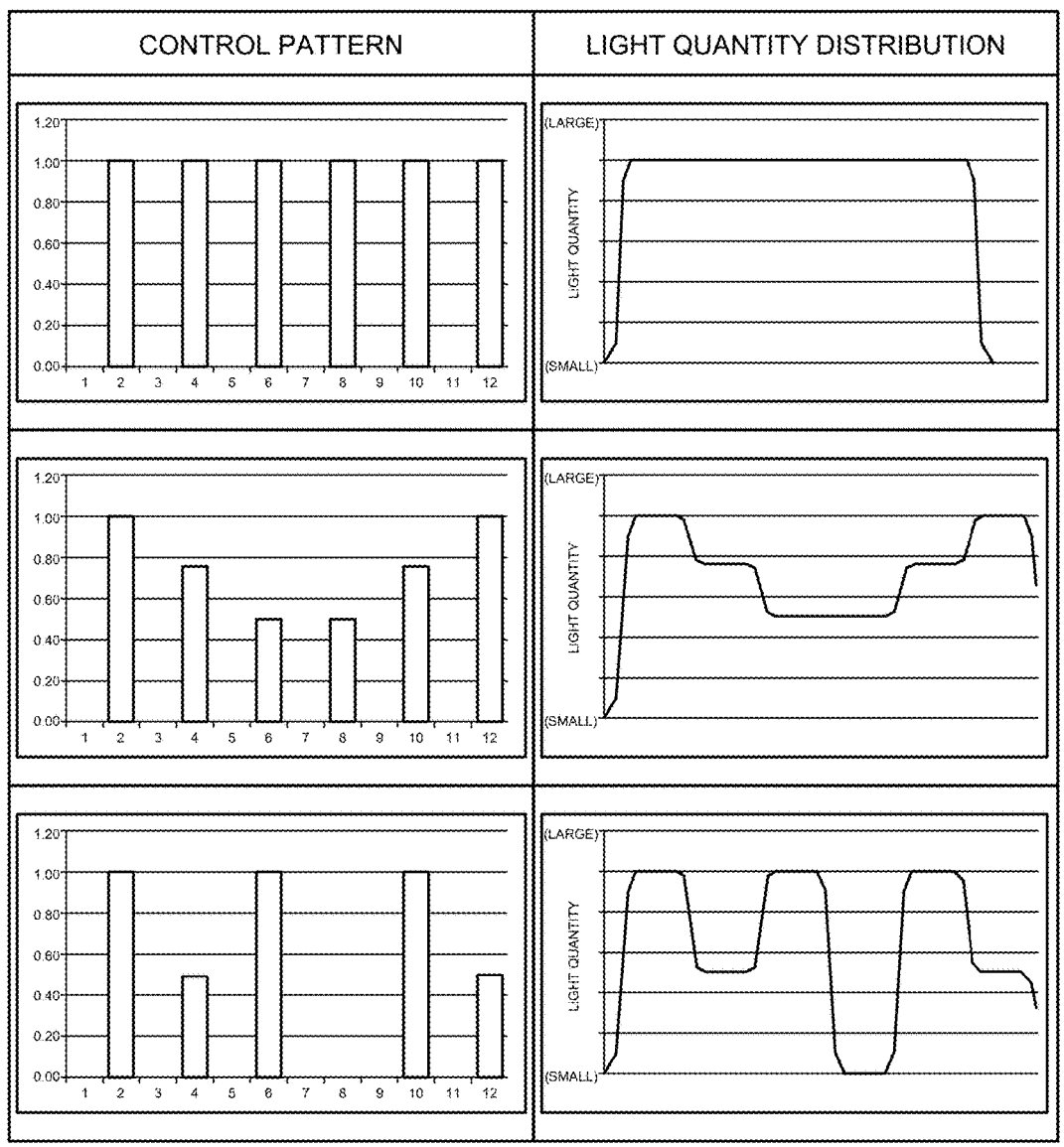
FIG. 10 depicts diagrams illustrating exemplary relations between control patterns for controlling the luminance of light constituting the light beams overlapping along one direction and light quantity distributions along the one direction obtained when the control patterns are used to output the light beams that exhibit light quantity distribution patterns in each of which the center of one of the light beams does not overlap a part of the light quantity varying region of the other of the light beams.

FIG. 10 depicts diagrams illustrating exemplary relations between control patterns for controlling the luminance of light constituting the light beams L3 overlapping along one direction (Y-direction) and light quantity distributions along the one direction obtained when the control patterns are used to output the light beams L3 that exhibit light quantity distribution patterns in each of which the center of one of the light beams L3 does not overlap a part of the light quantity varying region of the other of the light beams L3. FIG. 10 illustrates examples in which the light quantity distribution pattern P2 illustrated in FIG. 6 is used. In the case of the light quantity distribution pattern P2 illustrated in FIG. 6, the center of one of the light beams L3 does not overlap a part of the light quantity varying region of the other of the light beams L3. As a result, the center in the horizontal scanning direction of the projection region of the light beam L3 is not affected by the light quantities of projection regions in the horizontal scanning direction of other two light beams L3 projected onto both end sides along one direction (Y-direction, that is, the vertical synchronizing scanning direction). Hence, the light quantity distribution can be easily controlled according to a light quantity distribution obtained with respect to the one direction (such as a light quantity distribution corresponding to an image to be output by the image output device 2). Accordingly, the control pattern can be generated more easily, and the resolution in the one direction of the control pattern is likely to be less required than in the examples illustrated in FIG. 9.

Figure 11:
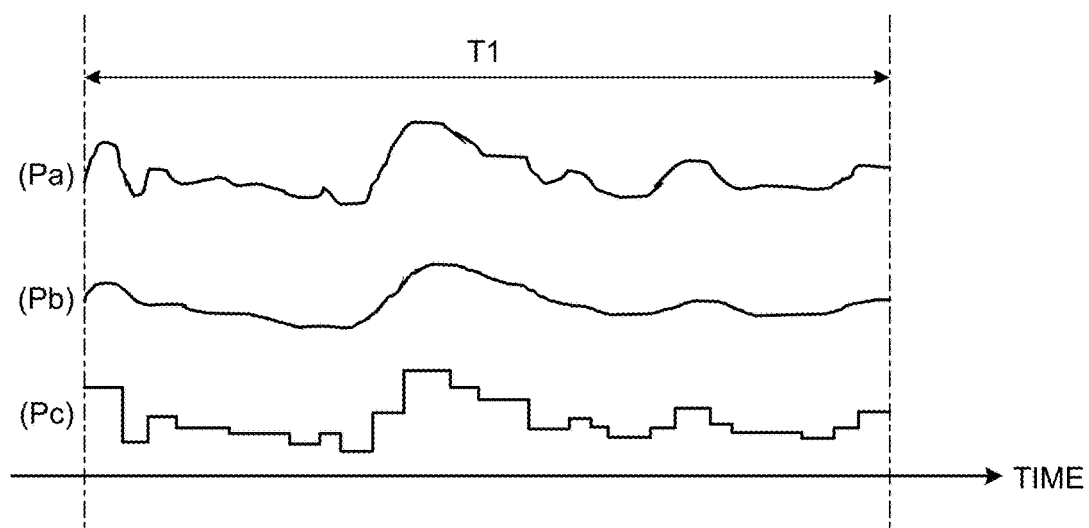
FIG. 11 is a graph illustrating exemplary control patterns of light quantity control along another direction.

FIG. 11 is a graph illustrating exemplary control patterns of light quantity control along the other direction (X-direction). In FIG. 11, a direction toward the upper side of the graph of the patterns Pa, Pb, and Pc represents a direction in which the light quantity increases, and a direction toward the lower side thereof represents a direction in which the light quantity decreases. A period T1 in the right-left direction of FIG. 11 represents a horizontal synchronizing scanning period in which one horizontal scan is performed. In the present embodiment, in one horizontal scan performed during the horizontal synchronizing scanning period, the light quantity distribution in the other direction can be controlled by controlling the luminance of light constituting the light beam L3 during the horizontal synchronizing scanning period. In other words, with respect to the other direction, the luminance of light constituting the light beam L3 is relatively increased in a horizontal scan performed in a position where a relatively large light quantity is required, and the luminance of light constituting the light beam L3 is relatively reduced in a horizontal scan performed in a position where a relatively small light quantity is required. In this manner, the light quantity distribution pattern along the other direction can be controlled. In the present embodiment, the light quantity distributions in the two-dimensional directions is controlled by combination of the control of the light quantity distribution in one direction described with reference to FIGS. 9 and 10 and the control of the light quantity distribution in the other direction described above.

The pattern Pb of the light beam L2 of illustrated in FIG. 3 has a larger width in the other direction than that of the pattern Pa of the light beam L2. The patterns Pa and Pb of the light beam L2 have no light quantity varying region in the other direction, and are continuous over the widths thereof in the other direction without decreasing in light quantity at the center of the beam. Hence, if the period T1 is constant, that is, if the scanning speed along the other direction is constant, a time period during which one position is continued to be irradiated with the light beam L3 of the pattern Pb is longer than a time period during which one position is continued to be irradiated with the light beam L3 of the pattern Pa. Consequently, when the width in the other direction of the light beam L3 is smaller as in the case of the pattern Pa compared with the pattern Pb, the control can be performed more easily to reproduce a light quantity distribution more faithful to a light quantity distribution obtained with respect to the other direction (such as the light quantity distribution corresponding to the image to be output by the image output device 2). In contrast, when the width in the other direction of the light beam L3 is larger as in the case of the pattern Pb compared with the pattern Pa, the variation in light quantity with respect to the other direction can be restrained from being excessively large, and thus, an artifact can be restrained from occurring in a position where the light beams L3 overlap each other. In addition, a relatively large overall light quantity can be easily ensured.

The light beam L2 of the pattern Pc has the light quantity varying region in the other direction. Hence, the variation in light quantity in the other direction can be restrained from being excessively large in relation to the control of the luminance of light constituting the light beam L3 performed along with the horizontal scan, and thus, the artifact can be restrained from occurring in the position where the light beams L3 overlap each other. In the case of the light beam L3 that has the light quantity varying region in the other direction as described above, even when the faithful control pattern is applied according to the light quantity distribution obtained with respect to the other direction (such as the light quantity distribution corresponding to the image to be output by the image output device 2), the variation in light quantity in the other direction can be automatically restrained from being excessively large by the light quantity varying region in the other direction, and thus, the artifact can be restrained from occurring in the position where the light beams L3 overlap each other. Accordingly, the demand for correction of the control pattern corresponding to the width of the light beam L3 can be easily reduced, and the light quantity control can be performed more easily.

FIG. 12 is a flowchart illustrating an exemplary flow of operation control of the image projection apparatus. In the present embodiment, the light source device 6 performs the projection of the light beam L3 and the scanning in the two-dimensional directions so as to obtain the light quantity distribution corresponding to the image to be output by the image output device 2. Specifically, in the present embodiment, for example, a control circuit 100 (refer to FIG. 14) performs processing of Steps S1 to S5 illustrated in FIG. 12. The control circuit 100 is, for example, a circuit coupled to the image output device 2 through wiring, such as a printed-circuit board (not illustrated), but is not limited to this configuration. The specific form of mounting of the control circuit 100 can be modified as appropriate.

The control circuit 100 analyzes an image to be output by the image output device 2 (Step S1). Specifically, the control circuit 100 performs, for example, processing to check the distribution of gradation values (input gradation values) of pixels represented by data of the image to be output. A relatively large light quantity is required for a region where a pixel of relatively high input gradation values is located. The control circuit 100 determines, based on the analysis at Step S1, a luminance modulation pattern in the image output area 21 (Step S2). The luminance modulation pattern is a pattern that more faithfully represents the light quantity distribution corresponding to the image to be output by the image output device 2. The control circuit 100 calculates, based on the determination at Step S2, the luminance distribution of light constituting the light beam L3 required for reproducing the luminance modulation pattern (Step S3). Specifically, at Step S3, the control circuit 100 calculates the control pattern of luminance of light from the illumination element 81 that emits the light constituting the light beam L3 used for the horizontal scanning and the vertical scanning. The luminance is controlled based on the control pattern, whereby the light quantity distribution corresponding to the image to be output by the image output device 2 is achieved by the scanning in the two-dimensional directions through the horizontal scanning and the vertical scanning. The control circuit 100 calculates, based on the result of the calculation at Step S3, pixel signals according to the luminance distribution (Step S4). As described with reference to FIGS. 9 and 11 above, the required luminance modulation pattern (Step S2) does not always fully match the luminance distribution of the light to be actually projected (Step S3). Hence, in the present embodiment, the input gradation values are corrected by taking into account the fact that the light to be actually projected has the luminance distribution of the light obtained by the processing at Step S3. As a result, the contrast of an image that is projected so as to be viewed by the user by being output to the image output device 2 using the light source device 6 as a light source is made closer to that represented by the input gradation values. The calculation at Step S4 is a calculation to derive the gradation values after being subjected to the correction, the corrected gradation values serving as the pixel signals to be output to the corresponding pixels included in the image output device 2. Based on the processing at Steps S3 and S4, the control circuit 100 outputs the pixel signals and a command for driving the light source device 6 (Step S5).

FIG. 13 is a diagram illustrating an example of the correction of the pixel signals based on the input gradation values and the light quantity. For example, in a case where the light quantity is 100%, that is, a light quantity at which the output can be faithfully performed at luminance corresponding to the gradation values, directly outputting the input gradation values (such as (R, G, B)=(100, 100, 100)) as the pixel signals can provide an image output corresponding to the input gradation values. By contrast, in a case where the light quantity is 50%, directly outputting the input gradation values (such as (R, G, B)=(100, 100, 100)) as the pixel signals will result in an image output of half the luminance ((R, G, B)=(50, 50, 50)). Hence, the control circuit 100 corrects the input gradation values according to the light quantity so as to derive the pixel signals that enable an image output corresponding to the input gradation values. For example, in a case where the light quantity is 50%, the control circuit 100 derives pixel signals (such as (R, G, B)=(200, 200, 200)) obtained by doubling the input gradation values, thus can provide an image output corresponding to the input gradation values. At Step S4, the control circuit 100 derives the pixel signals that have been subjected to correction, such as that illustrated in FIG. 13. If the output luminance of the image output device 2 is not proportional to the input gradation values (for example, if the image output device uses a display element having a gamma of 2.2), the output gradation values may be corrected so as to obtain a predetermined output luminance value. The derivation of the pixel signals described with reference to FIG. 13 is merely an example, and is not limited thereto. For example, image processing to be described later may be used to derive the pixel signals.

The following describes the image output device 2. The image output device 2 of the present embodiment is a transmissive liquid crystal display device that outputs an image using the light beam L3 as a light source, but is not limited thereto. The image output device 2 may be, for example, a reflective liquid crystal display device or a digital micromirror device (DMD) (registered trademark).

Figure 14:
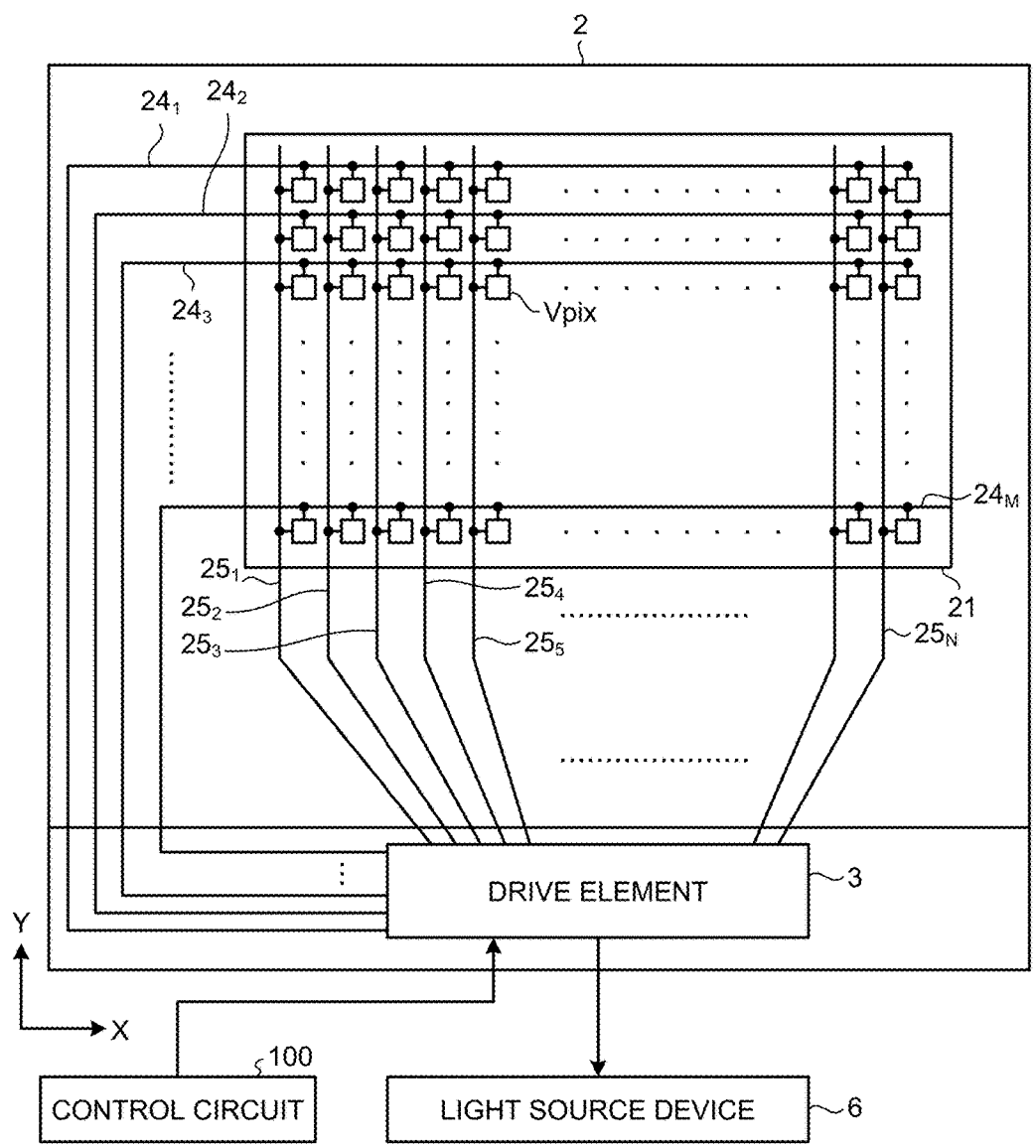
FIG. 14 is a block diagram illustrating a system configuration example of an image output device according to the embodiment.
Figure 15:
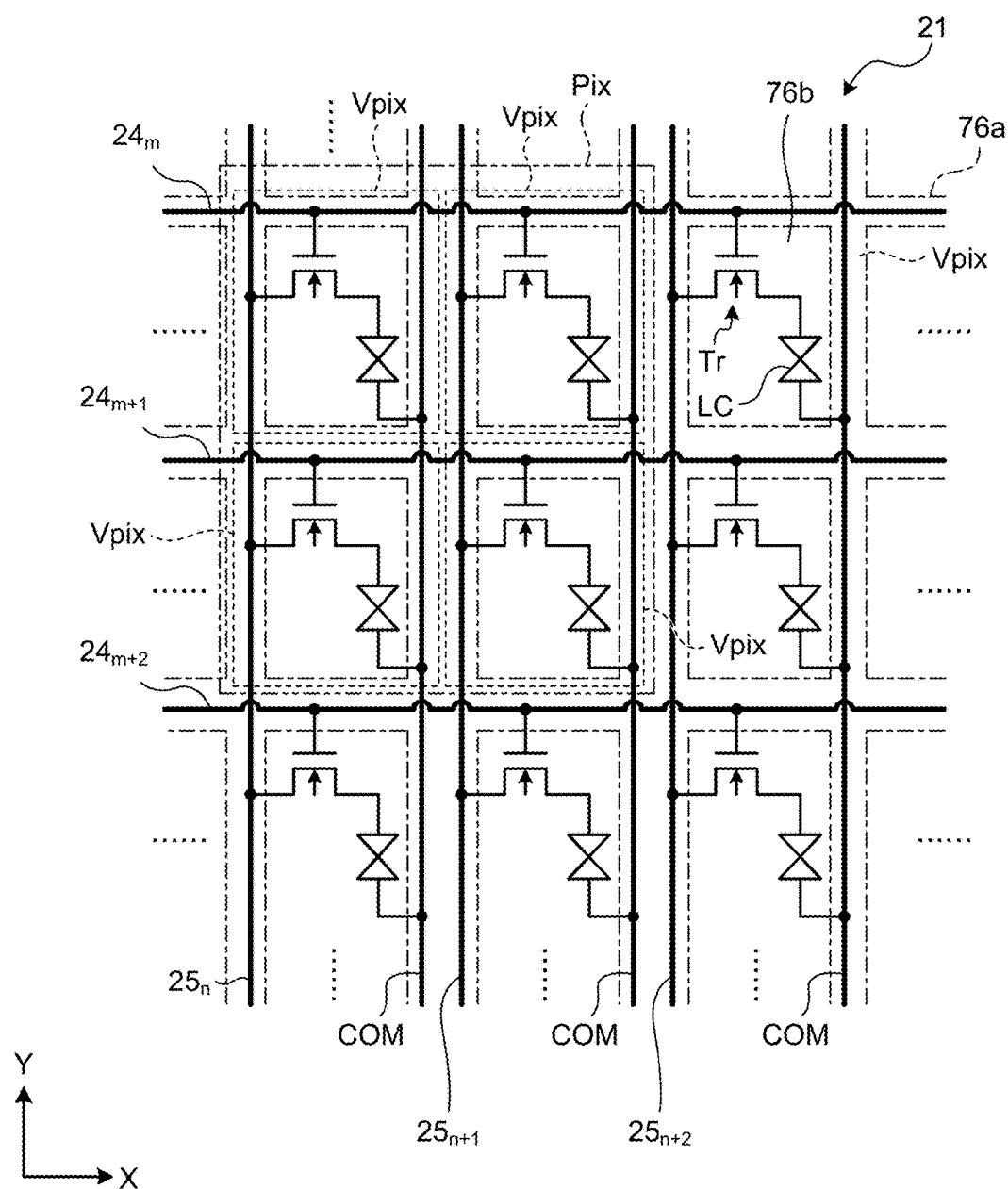
FIG. 15 is a circuit diagram illustrating a drive circuit that drives pixels Pix of the image output device according to the embodiment.

FIG. 14 is a block diagram illustrating a system configuration example of the image output device 2 according to the present embodiment. FIG. 15 is a circuit diagram illustrating a drive circuit that drives pixels Pix of the image output device 2 according to the present embodiment. Each of the pixels Pix includes a plurality of sub-pixels Vpix. The image output device 2 is, for example, a transmissive liquid crystal display device, and includes an image output panel, a drive element 3, such as a display driver integrated circuit (DDIC), and the light source device 6.

The image output panel includes, for example, a light-transmitting insulating substrate, such as a glass substrate. The image output panel also includes the image output area 21 that is located on a surface of the glass substrate. In the image output area 21, the plurality of pixels Pix including liquid crystal cells (refer to FIG. 15) are arranged in a matrix. The glass substrate includes a first substrate and a second substrate. The first substrate is a substrate on which a plurality of pixel circuits including active elements (such as transistors) are arranged in a matrix. The second substrate is arranged opposite to the first substrate with a predetermined gap interposed therebetween. The predetermined gap between the first and second substrates is maintained by photo spacers that are arranged at various places on the first substrate. The gap between the first and second substrates is filled with liquid crystals. The arrangements and sizes of components illustrated in FIG. 14 are only schematic, and do not reflect, for example, the actual arrangements thereof.

In the image output area 21, the sub-pixels Vpix including a liquid crystal layer are arranged in a matrix, that is, in M rows×N columns. In this description, the rows refers to pixel rows that have each N sub-pixels Vpix and that are arranged in a predetermined direction, and the columns refer to pixel columns that have each M sub-pixels Vpix and that are arranged in a direction orthogonal to the predetermined direction are arranged. The values of M and N are determined according to a resolution in the vertical direction and a resolution in the horizontal direction. In the image output area 21, scanning lines $24_1, 24_2, 24_3, \ldots, 24_M$ are arranged on a row-by-row basis, and signal lines $25_1, 25_2, 25_3, \ldots, 25_N$ are arranged on a column-by-column basis, with respect to the M-row and N-column array of the sub-pixels Vpix. Hereinafter, in some cases in the present embodiment, the scanning lines $24_1, 24_2, 24_3, \ldots, 24_M$ will be denoted as scanning lines 24 as a representative term, and the signal lines $25_1, 25_2, 25_3, \ldots, 25_N$ will be denoted as signal lines 25 as a representative term. Also, in the present embodiment, any three of the scanning lines $24_1, 24_2, 24_3, \ldots, 24_M$ will be denoted as scanning lines $24_m, 24_{m+1},$ and $24_{m+2}$ (where m is a natural number satisfying m≤M−2), and any four of the signal lines $25_1, 25_2, 25_3, \ldots, 25_N$ will be denoted as signal lines $25_n, 25_{n+1}, 25_{n+2},$ and $25_{n+3}$ (where n is a natural number satisfying n≤N−3).

The drive element 3 is a circuit that is mounted on the glass substrate of the image output panel, for example, by a chip-on-glass (COG) process. The drive element 3 is coupled to, for example, the external control circuit 100 and an external input power supply through a flexible printed circuit (FPC) board (not illustrated). The control circuit 100 transmits various signals related to operation of the image output device 2 to the drive element 3. The external input power supply supplies power required for operation of the drive element 3 through, for example, a connection terminal 41 (to be described later). The control circuit 100 is a circuit included in, for example, an electronic apparatus provided with the image output device 2.

More specifically, the drive element 3 operates the image output device 2, for example, according to the various signals supplied from the control circuit 100. The control circuit 100 outputs, for example, a master clock signal, a horizontal synchronizing signal, a vertical synchronizing signal, the pixel signals, and a drive command signal of the light source device 6 to the drive element 3. The drive element 3 functions as a gate driver and a source driver based on, for example, these signals. The drive element 3 outputs the drive command signal of the light source device 6 to the light source device 6. The drive command signal is generated based on the luminance distribution obtained by the calculation at Step S3 described above. Either or both of the gate driver and the source driver may be formed on the substrate using thin-film transistors (TFTs) (to be described later). In that case, either or both of the gate driver and the source driver only needs or need to be electrically coupled to the drive element 3. The gate driver and the source driver may be electrically coupled to the corresponding separate drive elements 3, or coupled to the same drive element 3.

The gate driver latches digital data on a per horizontal period basis according to the horizontal synchronizing signal in synchronization with the vertical synchronizing signal and the horizontal synchronizing signal. The gate driver sequentially supplies the latched digital data for one line as a vertical scan pulse to each of the scanning lines 24 (scanning lines $24_1, 24_2, 24_3, \ldots, 24_M$) in the image output area 21 so as to sequentially select the sub-pixels Vpix row by row. The gate driver sequentially outputs the digital data, for example, to the scanning lines $24_1, 24_2, \ldots$ in the order from one end side to the other end side in the row direction in the image output area 21. The gate driver can alternatively sequentially output the digital data to the scanning lines $24_M, \ldots$ in the order from the other end side to one end side in the row direction in the image output area 21.

The source driver is supplied with, for example, data for driving the pixels that has been generated based on the pixel signals. The source driver writes the data for driving the pixels, through the signal lines 25 (signal lines $25_1, 25_2, 25_3, \ldots, 25_N$), to the sub-pixels Vpix in a row selected by the vertical scanning performed by the gate driver, for one sub-pixel at a time, a plurality of sub-pixels at a time, or all the sub-pixels at a time.

Examples of a known driving method for the liquid crystal display device include, but are not limited to, a line inversion driving method, a dot inversion driving method, and a frame inversion driving method. The line inversion driving method is a driving method in which the polarity of a video signal is inverted at a time period of 1H (H is a horizontal period) corresponding to one line (one pixel row). The dot inversion driving method is a driving method in which the polarity of the video signal is alternately inverted between sub-pixels adjacent to each other in two intersecting directions (such as in the row and column directions). The frame inversion driving method is a driving method in which the polarity of video signals to be written to all the sub-pixels in each frame corresponding to one screen is inverted at once into the same polarity. The image output device 2 can employ any of the driving methods described above.

In the description of the present embodiment, each the M scanning lines $24_1, 24_2, 24_3, \ldots, 24_M$ is referred to as a scanning line 24 in some cases when handled in a comprehensive sense. The scanning lines $24_m, 24_{m+1}$, and $24_{m+2}$ illustrated in FIG. 15 are some of the M scanning lines $24_1, 24_2, 24_3, \ldots, 24_M$. Each of the N signal lines $25_1, 25_2, 25_3, \ldots, 25_N$ is referred to as a signal line 25 in some cases when handled in a comprehensive sense. The signal lines $25_n, 25_{n+1}$, and $25_{n+2}$ illustrated in FIG. 15 are some of the N signal lines $25_1, 25_2, 25_3, \ldots, 25_N$.

In the image output area 21, wiring is formed, such as the signal lines 25 for supplying the pixel signals to thin-film transistor (TFT) elements Tr of the sub-pixels Vpix and the scanning lines 24 for driving the TFT elements Tr. In this manner, the signal lines 25 extend in a plane parallel to the surface of the glass substrate described above, and supply the data for driving the pixels that has been generated based on the pixel signals for outputting the image to the sub-pixels Vpix. Each of the sub-pixels Vpix includes the TFT element Tr and a liquid crystal element LC. The TFT element Tr is constituted by a thin-film transistor, and the thin-film transistor is an re-channel metal oxide semiconductor (MOS) TFT, in this example. One of the source and the drain of the TFT element Tr is coupled to the signal line 25, and the other thereof is coupled to one end of the liquid crystal element LC. The gate of the TFT element Tr is coupled to the scanning line 24. The one end of the liquid crystal element LC is coupled to the other of the source and the drain of the TFT element Tr, and the other end thereof is coupled to a common electrode COM. A drive electrode driver (not illustrated) applies a drive signal to the common electrode COM. The drive electrode driver may be a component of the drive element 3, or may be an independent circuit.

The sub-pixel Vpix is coupled to other sub-pixels Vpix belonging to the same row in the image output area 21 via a corresponding one of the scanning lines 24. The scanning lines 24 are coupled to the gate driver, and are each supplied with the vertical scan pulse of a scan signal from the gate driver. The sub-pixel Vpix is also coupled to other sub-pixels Vpix belonging to the same column in the image output area 21 via a corresponding one of the signal lines 25. The signal lines 25 are coupled to the source driver, and are supplied with the pixel signals from the source driver. The sub-pixel Vpix is further coupled to other sub-pixels Vpix belonging to the same column in the image output area 21 via a corresponding one of the common electrodes COM. The common electrodes COM are coupled to the drive electrode driver (not illustrated), and supplied with the drive signal from the drive electrode driver.

The gate driver applies the vertical scan pulse to the gates of the TFT elements Tr of the sub-pixels Vpix via the corresponding scanning lines 24 so as to sequentially select, as a target of image output, one row (one horizontal line) of the sub-pixels Vpix formed in a matrix in the image output area 21. The source driver supplies the pixel signals, via the corresponding signal lines 25, to the sub-pixels Vpix included in one horizontal line sequentially selected by the gate driver. These sub-pixels Vpix perform the image output for one horizontal line according to the supplied pixel signals.

As described above, in the image output device 2, the gate driver drives the scanning lines 24 so as to sequentially scan them, and thereby sequentially selects each horizontal line. In the image output device 2, the source driver supplies the pixel signals to the sub-pixels Vpix belonging to one horizontal line via the signal lines 25 so as to perform the image output on a per horizontal line basis. The drive electrode driver is configured to apply the drive signal to the common electrode COM corresponding to the horizontal line when this image output operation is performed.

In the image output area 21, a color filter is arranged. The color filter includes a black matrix 76a having a grid shape and openings 76b. The black matrix 76a is formed so as to cover the outer circumferences of the sub-pixels Vpix, as illustrated in FIG. 15. In other words, the black matrix 76a is arranged at boundaries between the two-dimensionally arranged sub-pixels Vpix so as to have the grid shape. The black matrix 76a is formed of a material having a high light absorption factor. The openings 76b are openings formed by the grid shape of the black matrix 76a, and are arranged corresponding to the sub-pixels Vpix.

The openings 76b include color regions corresponding to sub-pixels for outputting three colors (such as red (R), green (G), and blue (B)) or four colors. Specifically, the openings 76b include color regions colored, for example, in three colors of red (R), green (G), and blue (B) as examples of a first color, a second color, and a third color, and color regions of a fourth color (such as white (W)). The color regions colored, for example, in the three colors of red (R), green (G), and blue (B) are periodically arranged at the openings 76b of the color filter. If the fourth color is white (W), the coloring by the color filter is not applied to the openings 76b for white (W). If the fourth color is other than white, the color employed as the fourth color is produced by the color filter. In the present embodiment, one pixel Pix is associated with a set of four sub-pixels Vpix illustrated in FIG. 15 corresponding to four colors including the three color regions of R, G, and B and the fourth color (such as W). In the present embodiment, pixel signals for one pixel refer to pixel signals corresponding to one pixel Pix including the sub-pixels Vpix of red (R), green (G), blue (B), and the fourth color (white (W)). Hereinafter, red (R), green (G), blue (B), and white (W) will be simply referred to as R, G, B, and W in some cases. Also, a combination of red (R), green (G), and blue (B) will be referred to as RGB in some cases. Further, a combination of red (R), green (G), blue (B), and white (W) will be referred to as RGBW in some cases. If each of the pixels Pix includes the sub-pixels Vpix of two colors or less, or the sub-pixels Vpix of five colors or more, digital data according to the number of colors only needs to be supplied based on the original data of the image.

The color filter may have a combination of other colors as long as being colored in different colors from each other. The color filter generally gives the color regions of green (G) higher luminance than that of the color regions of red (R) and blue (B). If the fourth color is white (W), a light-transmitting resin may be used as the color filter to provide the white color.

When viewed from a direction orthogonal to the front side of the image output area 21, the scanning lines 24 and the signal lines 25 are arranged in a region overlapping the black matrix 76a of the color filter. This means that the scanning lines 24 and the signal lines 25 are hidden behind the black matrix 76a when viewed from the direction orthogonal to the front side. Regions of the image output area 21 where the black matrix 76a is not arranged serve as the openings 76b.

The following describes the image processing when the sub-pixels Vpix of four colors are used. This image processing relates to control of light of the white component in the image output performed by the image output device 2. Specifically, for example, a combination of gradation values of red (R), green (G), and blue (B) in an RGB color space can be handled as image signals in an RGBW color space by handling R, G, and B having the same gradation value as a color component of white (W). This image processing relates to control of the gradation values of R, G, B, and W corresponding to the image signals in the RGBW color space and control of the light quantity of the light source device 6 performed in conjunction with the control of the gradation values. That is, the image processing relates to determination of an expansion coefficient value ($\alpha$) for controlling the luminance of the illumination element 81.

First, the following describes the basic principle of replacing the combination of the gradation values of R, G, and B with the combination of the gradation values of R, G, B, and W. The following description will be made by way of an example of the processing based on input gradation values to one of the pixels Pix.

If the input gradation values are digital signals of RGB described above, letting Ro, Go, Bo, and Wo denote signals of respective colors to be output by the pixel of RGBW, the following relation of Expression (1) needs to be satisfied to prevent the display quality from changing.

$$Ri:Gi:Bi=(Ro+Wo):(Go+Wo):(Bo+Wo) \quad (1)$$

Denoting the maximum value of the signals Ri, Gi, and Bi as Max(Ri, Gi, Bi), the following relations of Expressions (2) to (4) are satisfied. Hence, Expressions (5) to (7) given below are satisfied.

$$Ri/\text{Max}(Ri,Gi,Bi)=(Ro+Wo)/(\text{Max}(Ri,Gi,Bi)+Wo) \quad (2)$$

$$Gi/\text{Max}(Ri,Gi,Bi)=(Go+Wo)/(\text{Max}(Ri,Gi,Bi)+Wo) \quad (3)$$

$$Bi/\text{Max}(Ri,Gi,Bi)=(Bo+Wo)/(\text{Max}(Ri,Gi,Bi)+Wo) \quad (4)$$

$$Ro=Ri\times((\text{Max}(Ri,Gi,Bi)+Wo)/\text{Max}(Ri,Gi,Bi))Wo \quad (5)$$

$$Go=Gi\times((\text{Max}(Ri,Gi,Bi)+Wo)/\text{Max}(Ri,Gi,Bi))Wo \quad (6)$$

$$Bo=Bi\times((\text{Max}(Ri,Gi,Bi)+Wo)/\text{Max}(Ri,Gi,Bi))Wo \quad (7)$$

A settable value of Wo can be defined as a function of the minimum value Min(Ri, Gi, Bi), as given by Expression (8) below, where f is any coefficient. That is, from the simplest point of view, Wo is given by Expression (9) below.

$$Wo=f(\text{Min}(Ri,Gi,Bi)) \quad (8)$$

$$Wo=\text{Min}(Ri,Gi,Bi) \quad (9)$$

It is understood from Expressions (8) and (9) given above that Wo=0 if image signals satisfying Min(Ri, Gi, Bi)=0 exist. In this case, the luminance of the pixel does not increase. Even if the expression Min(Ri, Gi, Bi)=0 is not satisfied, if Min(Ri, Gi, Bi) is a small value close to 0, the value of Wo is also small, so that the level of increase in the luminance is small.

A frame image represented by the input gradation values corresponding to all the pixels constituting the image to be output is divided into a plurality of partial regions, and the drive element 3 performs the image processing on each partial region. Due to this, simply following the basic principle can cause a state in which a part of the video picture is excessively bright, and the other part thereof is not bright. Consequently, if, for example, a part having high color saturation (such as a monochromatic part) is present on a background having low color saturation and high luminance, a large value of Wo can be set for the background, but a relatively small value of Wo is set for the part having high color saturation.

In general, human sensitivity to (visual characteristics for) color and brightness is greatly influenced by a relative difference in luminance from the surrounding area. Hence, a part having relatively lower luminance (such as the monochromatic part mentioned above) may sometimes look dull. This is referred to as what is called simultaneous contrast. Hence, to resolve the problem with the simultaneous contrast in the image processing of converting the RGB colors represented by the input gradation values of RGB into the combination of the RGBW colors, color conversion processing is performed in the present embodiment. The color conversion processing according to the present embodiment includes arithmetic processing (expansion processing) of improving the luminance of a plurality of pixels constituting an image to be output by the image output device 2 based on the image data. The following described the color conversion processing.

The expansion processing of the input gradation values will be described first. As represented by Expressions (10) to (12) below, the image processing expands the input gradation values Ri, Gi, and Bi so as to maintain the ratio therebetween.

$$Rj = \alpha \times Ri \quad (10)$$

$$Gj = \alpha \times Gi \quad (11)$$

$$Bj = \alpha \times Bi \quad (12)$$

To maintain the display quality of the image signals, the expansion processing is preferably performed so as to maintain the ratio (luminance ratio) between the gradation values of R, G, and B. The expansion processing is also preferably performed so as to maintain the gradation-luminance characteristics (gamma) of the input gradation values. If the color space after the image processing is the RGB color space, the expansion processing has a limitation. In particular, if a color represented by the input gradation values is already a bright color, the input gradation values can hardly be expanded in some cases.

In a display device (such as the image output device 2) employing the RGBW color space, the addition of W widens the dynamic range of luminance, so that the color space in which colors can be output is expanded. The expansion processing is performed up to the upper limit value of the color space formed by RGB and W components. Consequently, the expansion processing allows the luminance to exceed the limit value of 255 in the conventional RGB space.

If, for example, the luminance of the sub-pixel of white (W) is K times the luminance of the sub-pixels of red (R), green (G), and blue (B), the maximum value of Wo can be assumed to be 255×K. In this case, the values (luminance) of Rj, Gj, and Bj can take up to (1+K)×255 in the RGBW color space. As a result, the luminance can be increased even when the data satisfies Min(Ri, Gi, Bi)=0 or a small value, which has conventionally been an issue.

Figure 16:
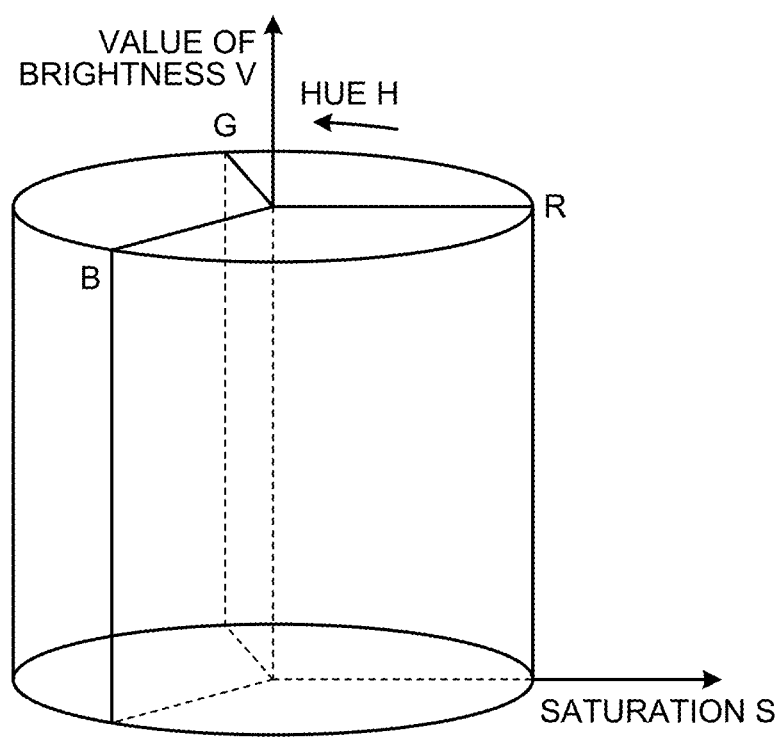
FIG. 16 is a diagram illustrating a color space of an RGB display.
Figure 17:
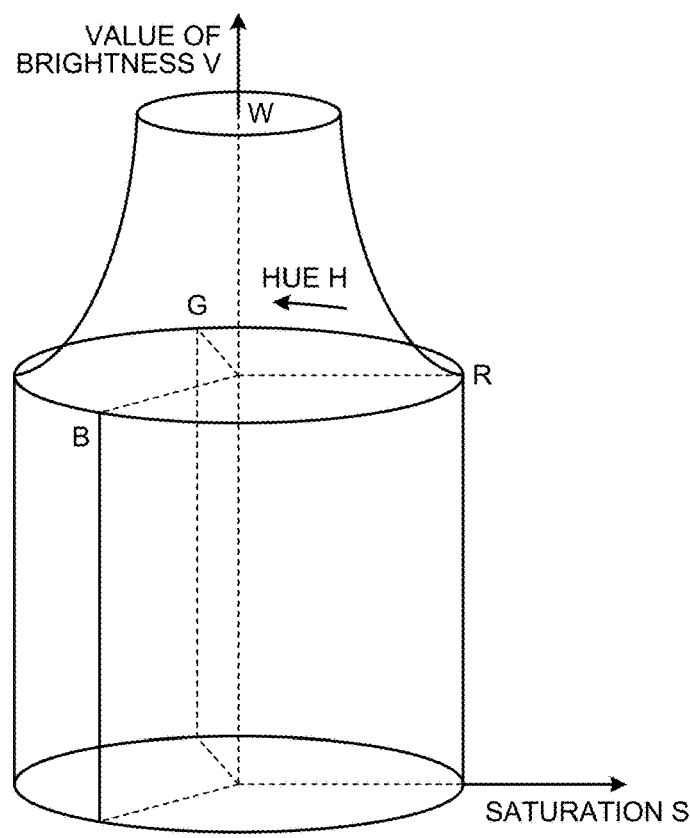
FIG. 17 is a diagram illustrating a color space of an RGBW display.
Figure 18:
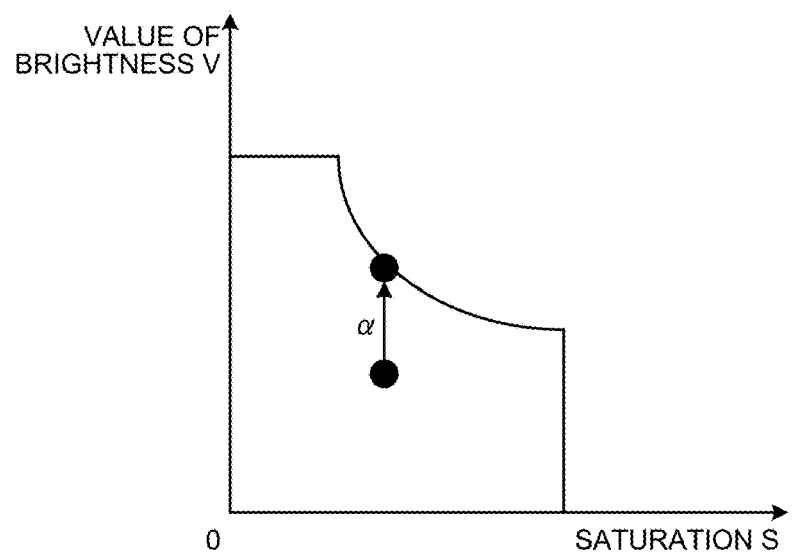
FIG. 18 is a cross-sectional view of the expanded color space of the RGBW display.

FIG. 16 is a diagram illustrating the color space of an RGB display. FIG. 17 is a diagram illustrating the color space of an RGBW display. FIG. 18 is a cross-sectional view of the expanded color space of the RGBW display. As illustrated in FIG. 16, all colors can be plotted at coordinates defined by hue (H), saturation (S), and a value of brightness (V). An HSV color space as one of well-known color spaces is defined by these attributes of the hue, the saturation, and the value of brightness. The hue refers to a difference between colors, such as red, blue, and green, and is an attribute that can best represent a difference in impression. The saturation is one of indicators representing a color, and is an attribute that indicates a level of vividness of a color. The value of brightness is an attribute that indicates a level of brightness of a color. A larger value of brightness represents a brighter color. In the HSV color space, the hue represents R at 0 degrees, and represents G and then B while turning counterclockwise to complete a full circular turn. The saturation indicates how much gray is mixed with each color. The saturation of 0% indicates that a color is most dull, and the saturation of 100% indicates that a color is least dull. The value of brightness of 100% indicates that a color is brightest, and the value of brightness of 0% indicates that a color is darkest.

Although the attributes defining the color space of the RGBW display are basically the same as the attributes defining the color space of the RGB display, the addition of W expands the value of brightness, as illustrated in FIG. 17. In this manner, the difference in color space between the RGB display and the RGBW display can be represented by the HSV color space defined by the hue (H), the saturation (S), and the value of brightness (V). According to this representation, the dynamic range of the value of brightness (V) expanded by the addition of W is found to greatly vary with the saturation (S).

This color conversion processing focuses on the fact that the coefficient α of the expansion processing for the signals Ri, Gi, and Bi serving as the input gradation values vary with the saturation (S). Specifically, the input gradation values are analyzed, and the expansion coefficient value (α) is determined according to the result of the analysis on an image-by-image basis. This processing allows the RGBW display device to output the picture while maintaining the display quality before and after the image processing.

In this processing, the expansion coefficient value (α) is preferably determined for each value of the saturation (S) ranging from 0 to the maximum value (255 in the case of an 8-bit value) by analyzing the input gradation values. The minimum value of the expansion coefficient values (α) thus obtained may be employed. In this case, the expansion processing can be performed without any loss in the display quality, such that the display quality is maintained before and after the image processing. In the present embodiment, the expansion processing is performed based on a ratio between the Max(R, G, B) value of the input image and a maximum brightness value V in the HSV color space. The ratio is calculated for each of saturation values from 0 to the maximum value, and the minimum value of the ratios is used as the expansion coefficient value (α) to perform the expansion processing.

To fully maintain the display quality, the input gradation values of all pixels constituting one piece of image data are preferably analyzed. The term "analysis" used herein refers to processing to obtain Min(Ri, Gi, Bi) and Max(Ri, Gi, Bi). To increase the processing speed in the color conversion processing and reduce the circuit scale of the circuit for performing the image processing, the analysis is preferably performed by sampling the pixels constituting the image data and analyzing the input gradation values corresponding to the sampled pixels, on a partial region-by-partial region basis. Specifically, the input gradation values are analyzed, for example, at intervals of every n pixels (where n is a natural number of 1 or larger). Furthermore, an ergonomic approach can naturally be used as a method for determining the expansion coefficient value (α).

A mere slight local change in the signals Ri, Gi, and Bi serving as the input gradation values cannot cause a person to notice the change. Consequently, the expansion coefficient value (α) is increased to the perception limit of the display quality change so that the signals can be expanded without causing the perception of the display quality change.

As illustrated in FIG. 18, signals (gradation values) after the image processing are generated based on the expansion coefficient value (α) determined by comparing the levels of the input video picture signals with respect to the expanded RGBW color space.

The following describes a method for determining Wo from the expanded image signals Rj, Bj, and Gj. As described above, the expanded image signals Rj, Bj, and Bj are preferably analyzed to obtain a minimum value Min(Rj, Gj, Bj) of each pixel and to set Wo to Min(Rj, Gj, Bj). This is the maximum possible value of Wo. Consequently, Wo is determined by analyzing the expanded image signals Rj, Gj, and Bj to obtain the minimum value Min(Rj, Gj, Bj), and setting the result as Wo.

If Wo is determined by the method described above, new RGB image signals are obtained as given by Expressions (13) to (15) below.

$$Ro = Rj - Wo \quad (13)$$

$$Go = Gj - Wo \quad (14)$$

$$Bo = Bj - Wo \quad (15)$$

Expanding the input image signals with the above-described method can set Wo to a larger value, and thus can further improve the luminance of the entire image. Reducing the luminance of the light source device 6 by a factor of $1/\alpha$ according to the expansion coefficient value ($\alpha$) can display the image at exactly the same luminance as that represented by the input gradation values. Setting the luminance of the light source device 6 to a value larger than that reduced by a factor of $1/\alpha$ can display the image at luminance higher than that represented by the input image signals.

The gradation values after the expansion processing described above are generated based on the expansion coefficient value ($\alpha$) determined by comparing the brightness level represented by the input gradation values with respect to the color space formed by the RGBW components. Consequently, the expansion coefficient value ($\alpha$) is image analysis information obtained as a result of analysis of an image of one frame.

The expansion coefficient value ($\alpha$) is determined by comparing the brightness level represented by the input gradation values with respect to the color space, and hence does not change even if the image information changes to some extent. For example, even if an image moves about on the screen, the expansion coefficient value ($\alpha$) remains unchanged unless the luminance or chromaticity greatly changes. Consequently, no problem is caused by execution of the RGBW conversion using the expansion coefficient value ($\alpha$) determined for the previous frame.

According to the present embodiment, the light quantity can be controlled in the two-dimensional directions through the operation of deflecting the light beam L3 capable of being modulated. Consequently, the light quantity can be reduced in a relatively darker portion of the image and increased in a relatively brighter portion thereof. In this manner, according to the present embodiment, a higher contrast can be obtained. The light beam L3 has the light quantity varying region, and the light quantity varying regions of the light beams are overlapped with each other with respect to the scanning direction along the directions in which the light quantities of the light beams L3 decrease due to the corresponding light quantity varying regions. As a result, the artifact can be restrained from occurring in the position where the light beams L3 overlap each other. The power consumption of the light source device 6 can be reduced by reducing the light quantity in the relatively darker portion of the image. Since the light quantity can be reduced in the relatively darker portion of the image and increased in the relatively brighter portion thereof, the dynamic range can be increased by outputting an image partially having high luminance.

In the present embodiment, the light beam L2 is a light beam forming a pattern in which, assuming the light quantity at the center of the light beam L2 as the reference value, the distance from the center to the position (first position) where the light quantity is halved from the reference value is equal to the distance from the position (first position) where the light quantity is halved from the reference value to the position (second position) where the light quantity becomes equal to zero, and in which, with respect to the position (first position) where the light quantity is halved from that of the center, the degree of increase in the light quantity toward the center of the light beam L2 has a symmetric relation with the degree of decrease in the light quantity toward the position (second position) where the light quantity becomes equal to zero. Consequently, the demand for correction of the control pattern corresponding to the light quantity distribution exhibited by the light beam L3 can be easily reduced, and processing load for the drive signal for controlling the light source device 6 can be reduced.

The light quantity varying regions are overlapped with each other so that the light quantity in the overlapped light quantity varying regions is equal to the light quantity at the center. As a result, the demand for correction of the control pattern corresponding to the light quantity distribution exhibited by the light beam L3 can be easily reduced, and processing load for the drive signal for controlling the light source device 6 can be reduced.

The light quantity varying region is formed corresponding to the curved surface of the lens 82 for forming the light beam L2. Consequently, the light quantity varying region can be formed by a simple configuration.

The light source device 6 of the present embodiment serves as the light source of the image output device 2 serving as the liquid crystal display device, and can thereby provide the excellent effects described above, such as the high contrast and the increased dynamic range, in the image projection apparatus using the liquid crystal display device.

Figure 19:
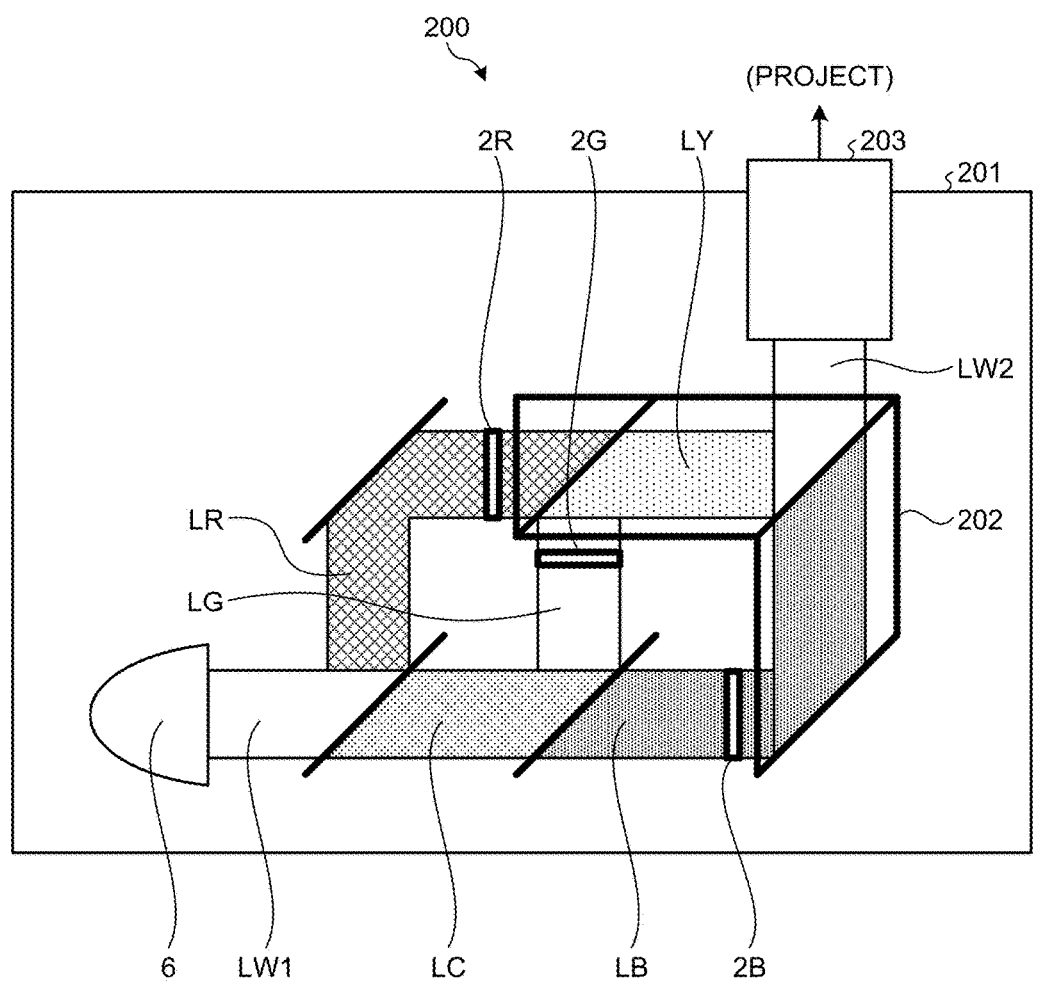
FIG. 19 is a diagram illustrating an exemplary main configuration of a projector to which the embodiment according to the present invention is applied.

The present invention is not limited to being applied to the HUD. FIG. 19 is a diagram illustrating an exemplary main configuration of a projector to which the embodiment according to the present invention is applied. This projector 200 uses optical components, such as prisms, to separate white light LW1 from the light source device 6 provided in a housing 201 into, for example, light LR in red (R) and light LC in cyan (C), and further separate the light LC in cyan (C) into light LG in green (G) and light LB in blue (B). The light LR in red (R), light LG in the green (G), and the light LB in blue (B) respectively pass through image output devices 2R, 2G, and 2B and are synthesized by a synthesizer 202 into an RGB image. The image output devices 2R, 2G, and 2B are respectively provided with the sub-pixels of red (R), green (G), and blue (B). That is, the image output devices 2R, 2G, and 2B are provided on a color-to-color basis. The synthesizer 202 synthesizes, for example, the light LR in red (R) and the light LG in green (G) into light LY in yellow (Y), and further synthesizes the light LY in yellow (Y) and the light LB in blue (B) into synthetic light LW2. The projector 200 projects the synthetic light LW2 through a projection device 203 to output the image.

The configuration illustrated in FIG. 19 is a configuration of a projector using what is called a mirror-sequential prism system that uses a transmissive image output device (such as the same type of component as the image output device 2). However, the configuration of a projector to which the present invention is applied is not limited to this configuration. The configuration can be modified as appropriate, and may use, for example, a cross dichroic prism system using a transmissive or reflective image output device or a color separating/synthesizing prism system using a reflective image output device.

The embodiment described above is merely an example, and is not limited thereto, but can be appropriately modified within a range specified by matters specifying the claimed invention. For example, the specific form of the scanning device 9 can be modified as appropriate. The scanning device 9 may be, for example, what is called a galvanometer scanner that employs plate-like planar mirrors instead of the polygonal mirrors 91a and 91b. The scanning device 9 may be what is called a resonant scanner that evokes resonance of planar mirrors to change the optical axis in two-dimensional directions.

Although the light source device 6 of the embodiment described above outputs the white light, this is merely an example. The configuration may be changed as appropriate. For example, the image projection apparatus may have a configuration that includes the individual light source devices 6 that output light of respective colors of red (R), green (G), and blue (B). In this case, for example, the image output devices 2R, 2G, and 2B provided for the corresponding colors can be employed as exemplified in the projector 200 illustrated in FIG. 19. The image projection apparatus may have a configuration that shares the image output device 2 by projecting light in different colors onto the image output device 2 at different times.

Other operational advantages accruing from the aspects described in the above embodiment that are obvious from the description in this specification, or that are appropriately conceivable by those skilled in the art will naturally be understood as accruing from the present invention.

The present disclosure includes the following aspects:

(1) A light source device comprising:
   a light emitting device that emits a light beam capable of being modulated; and
   a scanning device that deflects the light beam in a first direction and a second direction intersecting the first direction,
   wherein the light beam has a light quantity varying region in which a light quantity decreases outward from a center of the light beam in at least one of the first direction or the second direction, and
   wherein the scanning device overlaps the light quantity varying regions of a plurality of the light beams with each other with respect to a scanning direction along directions in which the light quantities of the light beams decrease.

(2) The light source device according to (1),
   wherein, in the light beam, assuming the light quantity at a center in at least one of the directions of the light beam as a reference value, a distance from the center to a position where the light quantity is halved from the reference value is equal to a distance from the position where the light quantity is halved from the reference value to a position where the light quantity becomes equal to zero, and, with respect to the position where the light quantity is halved from that of the center, a degree of increase in the light quantity toward the center of the light beam has a symmetric relation with a degree of decrease in the light quantity toward the position where the light quantity becomes equal to zero.

(3) The light source device according to (2),
   wherein the scanning device overlaps the light quantity varying regions with each other so that the light quantity in the overlapped light quantity varying regions is equal to the light quantity at the center.

(4) An image projection apparatus comprising:
   the light source device according to any one of (1) to (3); and
   an image output device that uses the light beam as a light source to output an image.

(5) The image projection apparatus according to (4),
   wherein the image output device is a liquid crystal display device.

(6) A head-up display apparatus comprising:
   a light source device; and
   an image projection device,
   wherein the light source device comprises:
      a light emitting device that emits a light beam capable of being modulated; and
      a scanning device that deflects the light beam in a first direction and a second direction intersecting the first direction, and
   wherein the image projection device comprises an image output device that uses the light beam as a light source to output an image.

(7) The head-up display apparatus according to (6),
   wherein the light beam has a light quantity varying region in which a light quantity decreases outward from a center of the light beam in at least one of the first direction or the second direction, and
   wherein the scanning device overlaps the light quantity varying regions of a plurality of the light beams with each other with respect to a scanning direction along directions in which the light quantities of the light beams decrease.

(8) The head-up display apparatus according to (6),
   wherein, in the light beam, assuming the light quantity at a center in at least one of the directions of the light beam as a reference value, a distance from the center to a position where the light quantity is halved from the reference value is equal to a distance from the position where the light quantity is halved from the reference value to a position where the light quantity becomes equal to zero, and, with respect to the position where the light quantity is halved from that of the center, a degree of increase in the light quantity toward the center of the light beam has a symmetric relation with a degree of decrease in the light quantity toward the position where the light quantity becomes equal to zero.

(9) The head-up display apparatus according to (8),
   wherein the scanning device overlaps the light quantity varying regions with each other so that the light quantity in the overlapped light quantity varying regions is equal to the light quantity at the center.

(10) The head-up display apparatus according to (6),
   wherein the image output device is a liquid crystal display device.

(11) The head-up display apparatus according to (6),
   wherein the light beam is configured to be transmitted through or reflected by the image output device,
   wherein the light beam is configured to be reflected by a mirror and a windshield, and
   wherein the light reflected by the mirror and the windshield is recognized as the image.

What is claimed is:
1. A light source device comprising:
   a light emitting device that emits a light beam capable of being modulated; and a scanning device that deflects the light beam in a first direction and a second direction intersecting the first direction, wherein the light beam has a light quantity varying region in which a light quantity decreases outward from a center of the light beam in at least one of the first direction or the second direction, wherein the scanning device overlaps the light quantity varying regions of a plurality of the light beams with each other with respect to a scanning direction along directions in which the light quantities of the light beams decrease, and wherein, in the light beam, assuming the light quantity at a center in at least one of the directions of the light beam as a reference value, a distance from the center to a position where the light quantity is halved from the reference value is equal to a distance from the position where the light quantity is halved from the reference value to a position where the light quantity becomes equal to zero, and, with respect to the position where the light quantity is halved from that of the center, a degree of increase in the light quantity toward the center of the light beam has a symmetric relation with a degree of decrease in the light quantity toward the position where the light quantity becomes equal to zero.

2. The light source device according to claim 1, wherein the scanning device overlaps the light quantity varying regions with each other so that the light quantity in the overlapped light quantity varying regions is equal to the light quantity at the center.

3. An image projection apparatus comprising:
the light source device according to claim 1; and
an image output device that uses the light beam as a light source to output an image.

4. The image projection apparatus according to claim 3, wherein the image output device is a liquid crystal display device.

5. A head-up display apparatus comprising:
a light source device; and
an image projection device,
wherein the light source device comprises:
a light emitting device that emits a light beam capable of being modulated; and
a scanning device that deflects the light beam in a first direction and a second direction intersecting the first direction, wherein the image projection device comprises an image output device that uses the light beam as a light source to output an image, wherein the light beam has a light quantity varying region in which a light quantity decreases outward from a center of the light beam in at least one of the first direction or the second direction, wherein the scanning device overlaps the light quantity varying regions of a plurality of the light beams with each other with respect to a scanning direction along directions in which the light quantities of the light beams decrease, and wherein, in the light beam, assuming the light quantity at a center in at least one of the directions of the light beam as a reference value, a distance from the center to a position where the light quantity is halved from the reference value is equal to a distance from the position where the light quantity is halved from the reference value to a position where the light quantity becomes equal to zero, and, with respect to the position where the light quantity is halved from that of the center, a degree of increase in the light quantity toward the center of the light beam has a symmetric relation with a degree of decrease in the light quantity toward the position where the light quantity becomes equal to zero.

6. The head-up display apparatus according to claim 5, wherein the scanning device overlaps the light quantity varying regions with each other so that the light quantity in the overlapped light quantity varying regions is equal to the light quantity at the center.

7. The head-up display apparatus according to claim 5, wherein the image output device is a liquid crystal display device.

8. The head-up display apparatus according to claim 5, wherein the light beam is configured to be transmitted through or reflected by the image output device,
wherein the light beam is configured to be reflected by a mirror and a windshield, and
wherein the light reflected by the mirror and the windshield is recognized as the image.

* * * * *